(12) United States Patent
Nomura et al.

(10) Patent No.: US 7,782,547 B2
(45) Date of Patent: Aug. 24, 2010

(54) MECHANISM FOR CONTROLLING POSITION OF OPTICAL ELEMENT

(75) Inventors: Hiroshi Nomura, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/399,147

(22) Filed: Mar. 6, 2009

(65) Prior Publication Data

US 2009/0231728 A1 Sep. 17, 2009

(30) Foreign Application Priority Data

Mar. 12, 2008 (JP) .............................. 2008-062473

(51) Int. Cl.
*G02B 15/14* (2006.01)
(52) U.S. Cl. .................. 359/696; 359/694; 359/704
(58) Field of Classification Search ......... 359/694–701, 359/819–823, 826; 396/72–75, 348–350
See application file for complete search history.

(56) References Cited

U.S. PATENT DOCUMENTS

| | | | | |
|---|---|---|---|---|
| 5,245,476 | A * | 9/1993 | Shono ...................... | 359/699 |
| 6,952,526 | B2 | 10/2005 | Nomura .................... | 396/73 |
| 7,079,761 | B2 | 7/2006 | Nomura .................... | 396/72 |
| 7,265,913 | B2 | 9/2007 | Nagai et al. ............... | 359/694 |
| 7,338,219 | B2 * | 3/2008 | Ishizuka et al. ........... | 396/349 |
| 2004/0042775 | A1 | 3/2004 | Nomura .................... | 396/73 |

FOREIGN PATENT DOCUMENTS

| | | |
|---|---|---|
| JP | 2000-206391 A | 7/2000 |
| JP | 2006-292950 A | 10/2006 |

OTHER PUBLICATIONS

English language Abstract and translation of JP 2000-206391 A (Jul. 28, 2000).
English language Abstract and translation of JP 2006-292950 A (Oct. 26, 2006).
U.S. Appl. No. 12/263,694 to Nomura, which was filed on Nov. 3, 2008.
U.S. Appl. No. 12/263,910 to Nomura, which was filed on Nov. 3, 2008.

* cited by examiner

*Primary Examiner*—Mohammed Hasan
(74) *Attorney, Agent, or Firm*—Greenblum & Bernstein, P.L.C.

(57) ABSTRACT

An optical element position control mechanism includes an optical element holding member, a lead screw rotatable on a rotational axis parallel to movement direction of the optical element holding member, a linearly moving nut screw-engaged with the lead screw and engaged with the optical element holding member, and a rotation prevention device preventing the linearly moving nut from rotating about the lead screw. Rotations of the lead screw cause the linearly moving nut to move along the lead screw, a position of the optical element holding member being determined by the linearly moving nut. A biasing device is positioned between the linearly moving nut and the optical element holding member and is resiliently deformable in a plane substantially parallel to a plane which includes the rotational axis of the lead screw, and applies a biasing force against the linearly moving nut so as to be prevented from rotating.

12 Claims, 19 Drawing Sheets

MECHANISM FOR CONTROLLING POSITION OF OPTICAL ELEMENT

BACKGROUND OF THE INVENTION

1. Field of the Invention

The present invention relates to a mechanism for controlling the position of an optical element in an optical apparatus. More specifically, the present invention relates to a mechanism which moves an optical element holding member via the use of a lead screw and a linearly moving nut (lead nut).

2. Description of the Related Art

In optical apparatuses such as cameras, a mechanism for controlling the position of an optical element with a lead screw and a linearly moving nut is often used. As an example, the following structure is known in the art. Namely, an optical element holding member is guided in a specific direction (e.g., in an optical axis direction or a direction orthogonal to the optical axis direction) by a linear guide device such as a guide shaft, and a lead screw is installed so that the moving direction of the optical element holding member and the rotational axis of the lead screw are parallel to each other. The linearly moving nut, that is screw-engaged with the lead screw, is engaged with the optical element holding member in a state of being prevented from rotating about the rotational axis of the lead screw. The optical element holding member is biased in a direction to remain in contact with the linearly moving nut so as to follow the linearly moving nut in the moving direction of the optical element holding member at all times. Upon rotating the lead screw, the linearly moving nut moves linearly in the direction of the rotational axis of the lead screw, and accordingly the optical element holding member linearly moves with the linearly moving nut. This structure is disclosed in Japanese Unexamined Patent Publication 2000-206391.

The anti-rotation mechanism for preventing the linearly moving nut from rotating is usually composed of a key groove and a projection which is engaged in the key groove. However, if even a slight gap exists in this anti-rotation mechanism, there is a possibility of the linearly moving nut vibrating (rattling) and thereby generating noise, especially when the lead screw is driven intermittently at a high speed. As a countermeasure against such noise, a technique of making the linearly moving nut out of synthetic resin and resiliently deforming the linearly moving nut so that no gap is created in the anti-rotation mechanism. More specifically, in the known art, the linearly moving nut is provided with a resiliently deformable arm that extends along a plane orthogonal to the rotational axis of the lead screw to suppress vibrations of the linearly moving nut by resilient deformation of the arm in the plane. However, to make such resilient deformation for the prevention of vibrations possible, the length of the arm (span from the fixed end of the arm to a force applying portion thereof) needs to be long to a certain degree, which is a restriction on miniaturization of the linearly moving nut. In addition, adopting a vibration suppressing structure using this kind of resiliently deformable arm causes an increase in the distance between the guide shaft, which guides the optical element holding member, and the lead screw. As a consequence, there is a possibility of the linearly moving nut vibrating (chattering) easily when the optical element holding member moves; moreover, there is a possibility of the compact design of the drive mechanism for the optical element holding member deteriorating.

SUMMARY OF THE INVENTION

The present invention provides an optical element position control mechanism using a lead screw and a linearly moving nut, wherein the optical element position control mechanism is configured to be capable of suppressing vibrations of the linearly moving nut and the optical element holding member and can be designed compact.

According to an aspect of the present invention, an optical element position control mechanism is provided, including an optical element holding member which holds an optical element and is linearly movable, a lead screw rotatable on a rotational axis extending parallel to a direction of movement of the optical element holding member, a linearly moving nut which is screw-engaged with the lead screw, and a rotation prevention device which prevents the linearly moving nut from rotating about the rotational axis of the lead screw. Forward and reverse rotations of the lead screw cause the linearly moving nut to move forward and rearward along the rotational axis of the lead screw, respectively, a position of the optical element holding member being determined by the forward and rearward movements of the linearly moving nut. The optical element position control mechanism includes a biasing device, wherein the biasing device is resiliently deformable in a biasing plane parallel to a plane which includes the rotational axis of the lead screw, and applies a biasing force against the linearly moving nut in a rotation-preventing direction in which the linearly moving nut is prevented from rotating by the rotation prevention device.

It is desirable for the biasing device to include a torsion spring including a first arm portion, the resilient deformation thereof in the biasing plane being restricted; and a second arm portion engaged with the linearly moving nut. The torsion spring can be resiliently deformed so as to rotate the first arm portion and the second arm portion toward and away from each other about an axis substantially orthogonal to the rotational axis of the lead screw.

It is desirable for the rotation prevention device to prevent the linearly moving nut from rotating relative to the optical element holding member, and for the first arm portion of the torsion spring to engage with the optical element holding member.

It is desirable for the rotation prevention device to include an anti-rotation projection which projects from the optical element holding member; and a pair of anti-rotation legs which is formed on the linearly moving nut and holds the anti-rotation projection between the pair of anti-rotation legs. The second arm portion of the torsion spring is in contact with one of the pair of anti-rotation legs and presses the one anti-rotation leg against the anti-rotation projection of the optical element holding member.

It is desirable for the rotation prevention device to include a pair of opposed surfaces formed on the optical element holding member, the pair of opposed surfaces being spaced apart from each other in a rotation direction about the rotational axis of the lead screw so as to be opposed to each other, and a resiliently contacting portion provided on the linearly moving nut, the resiliently contacting portion being inserted in between the pair of opposed surfaces to be resiliently pressed against the pair of opposed surfaces, the resiliently contacting portion also serving as the biasing device.

It is desirable for the pair of opposed surfaces to extend in directions substantially parallel to the rotational axis of the lead screw and lie substantially orthogonal to the biasing plane in which the resiliently contacting portion is resiliently deformable.

It is desirable for the resiliently contacting portion of the linearly moving nut is formed into a U-shape and includes a pair of rotation prevention arm portions which extend substantially parallel to each other and are in contact with the pair of opposed surfaces, respectively, and a curved connecting portion which connects the pair of rotation prevention arm portions to each other to allow the pair of rotation prevention arm portions to be resiliently deformed.

It is desirable for the optical element to include a lens group, and for the optical element holding member to be guided linearly in a direction parallel to an optical axis of the lens group.

It is desirable for the lens group to serve as a focusing lens group.

It is desirable for the biasing device to be a metal spring.

It is desirable for the biasing device to be molded as part of the linearly moving nut.

In an embodiment, a mechanism for controlling the position of a focusing lens group is provided, including a lens holder which holds the focusing lens group and is guided linearly in a direction of an optical axis of the focusing lens group; a lead screw extending in the optical axis direction; a linearly moving nut engaged with the lens holder, having a screw hole in which the lead screw is screw-engaged and being prevented from rotating relative to the lead screw; and a biasing device positioned between the linearly moving nut and the lens holder for biasing the linearly moving nut in a direction to prevent the linearly moving nut from rotating relative to the lead screw, wherein the biasing device is resiliently deformed in a plane substantially parallel to a plane including the rotational axis of the lead screw. Forward and reverse rotations of the lead screw cause the linearly moving nut to move forward and rearward along the rotational axis of the lead screw to thereby move the lens holder forward and rearward in the optical axis direction, respectively.

Although the type of optical element to be used or the moving direction thereof has not been limited or specifically indicated, it is desirable that the present invention be applied to a type of optical element control mechanism which moves a lens group linearly in the optical axis direction thereof.

The present disclosure relates to subject matter contained in Japanese Patent Application No. 2008-62473 (filed on Mar. 12, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
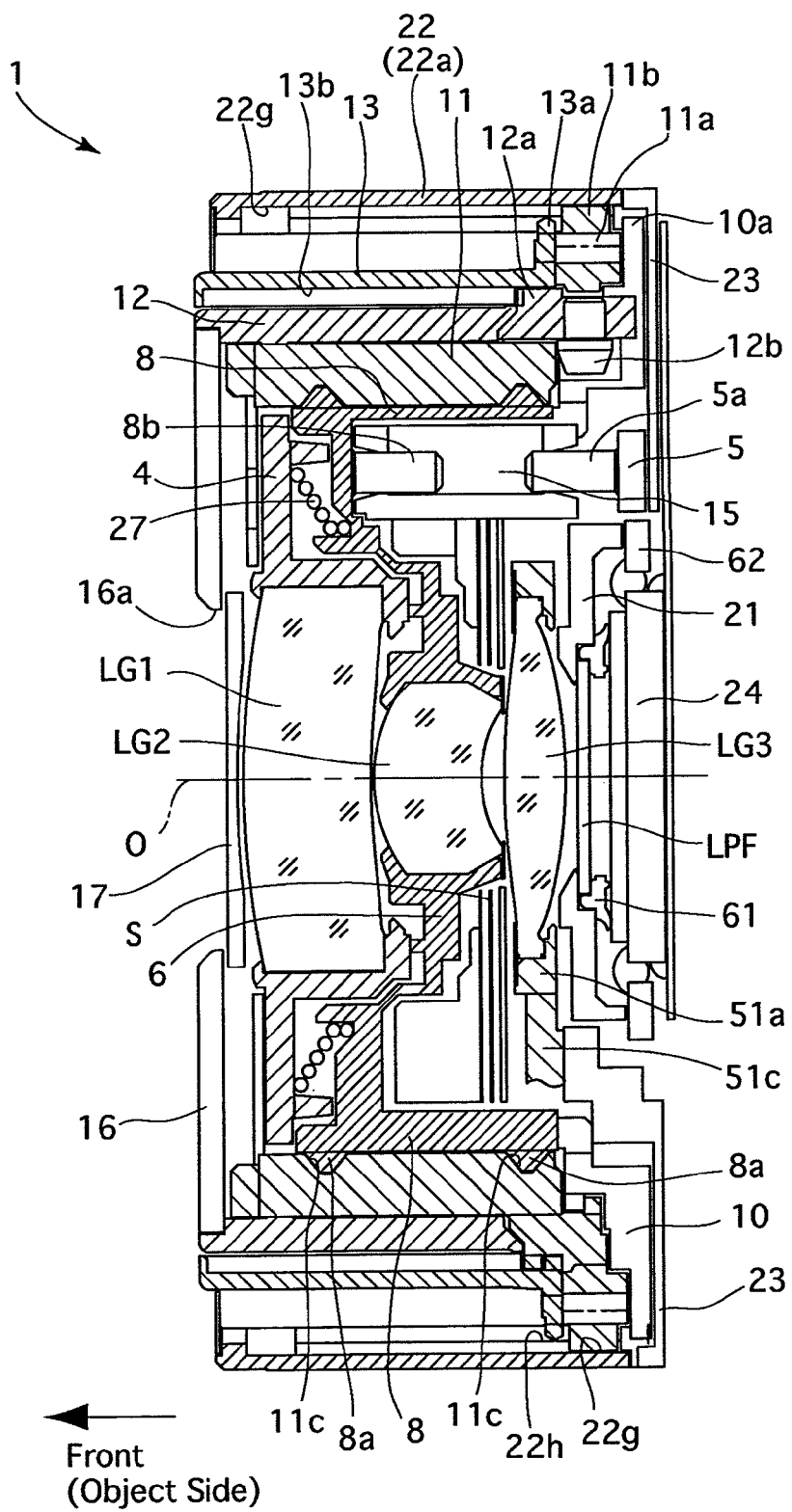
FIG. 1 is a cross sectional view of a zoom lens barrel to which a mechanism for controlling the position of an optical element according to the present invention is applied, showing the zoom lens barrel in a lens barrel accommodated state (fully-retracted state)

Firstly, the overall structure of a zoom lens barrel 1 to which an optical element position control mechanism according to the present invention is applied will be hereinafter discussed with reference mainly to FIGS. 1 through 7.

The zoom lens barrel 1 is provided with a photographing optical system which includes a first lens group LG1, a second lens group LG2, a set of shutter blades (mechanical shutter) S that also serves as a diaphragm, a third lens group LG3, a low-pass filter (optical filter) LPF and a CCD image sensor (image-pickup device) 24, in that order from the object side. This photographing optical system is configured as a zoom optical system, in which the focal length is variable. A focal-length varying operation (zooming operation) is performed by moving the first lens group LG1 and the second lens group LG2 along a photographing optical axis O of the photographing optical system in a predetermined moving manner, and a focusing operation is carried out by moving the third lens group LG3 along the photographing optical axis O. Note that direction along (on) the photographing optical axis O and a direction parallel to (off) the photographing optical axis O are hereinafter referred to as the "optical axis direction".

The zoom lens barrel 1 is provided with a stationary barrel (housing) 22 which supports the optical system from the first lens group LG1 to the third lens group LG3 inside the stationary barrel 22 to allow these lens groups to move in the optical axis direction. The zoom lens barrel 1 is provided with a lens barrel back plate (image-pickup device holding member) 23 which is fixed to the back of the stationary barrel 22. An opening is formed in a central portion of the lens barrel back plate 23, and the CCD image sensor 24 is held in the opening via an image-pickup device frame 62. A filter frame 21 which is fixed to the front of the image-pickup device frame 62 holds the low-pass filter LPF. A packing (sealing member) 61 for dust prevention is tightly held between the low-pass filter LPF and the CCD image sensor 24. The image-pickup device frame 62 is supported by the lens barrel back plate 23 so as to be a tilt-adjustable relative to the lens barrel back plate 23.

The stationary barrel 22 is provided with a cylindrical housing portion 22a, a zoom motor support portion 22b, an AF motor support portion 22c and a front wall portion 22d. The cylindrical housing portion 22a surrounds the photographing optical axis O, the zoom motor support portion 22b supports a zoom motor 32, the AF motor support portion 22c supports an AF motor 30, and the front wall portion 22d is positioned in front of the AF motor support portion 22c. The cylindrical housing portion 22a supports the aforementioned optical elements, such as each lens group, inside the cylindrical housing portion 22a and forms a substantial outer-shape of the zoom lens barrel 1. The zoom motor support portion 22b, the AF motor support portion 22c and the front wall portion 22d are positioned radially outside the cylindrical housing portion 22a about the photographing optical axis O. As shown in FIGS. 3 through 7, the AF motor support portion 22c is formed at a position in the optical axis direction which substantially corresponds to the position of the rear end of the cylindrical housing portion 22a in the optical axis direction, and the rear surface portion of the AF motor support portion 22c is closed by the lens barrel back plate 23. The front wall portion 22d is formed on the stationary barrel 22 at a forward position from the AF motor support portion 22c in the optical axis direction to face the AF motor support portion 22c.

Figure 6:
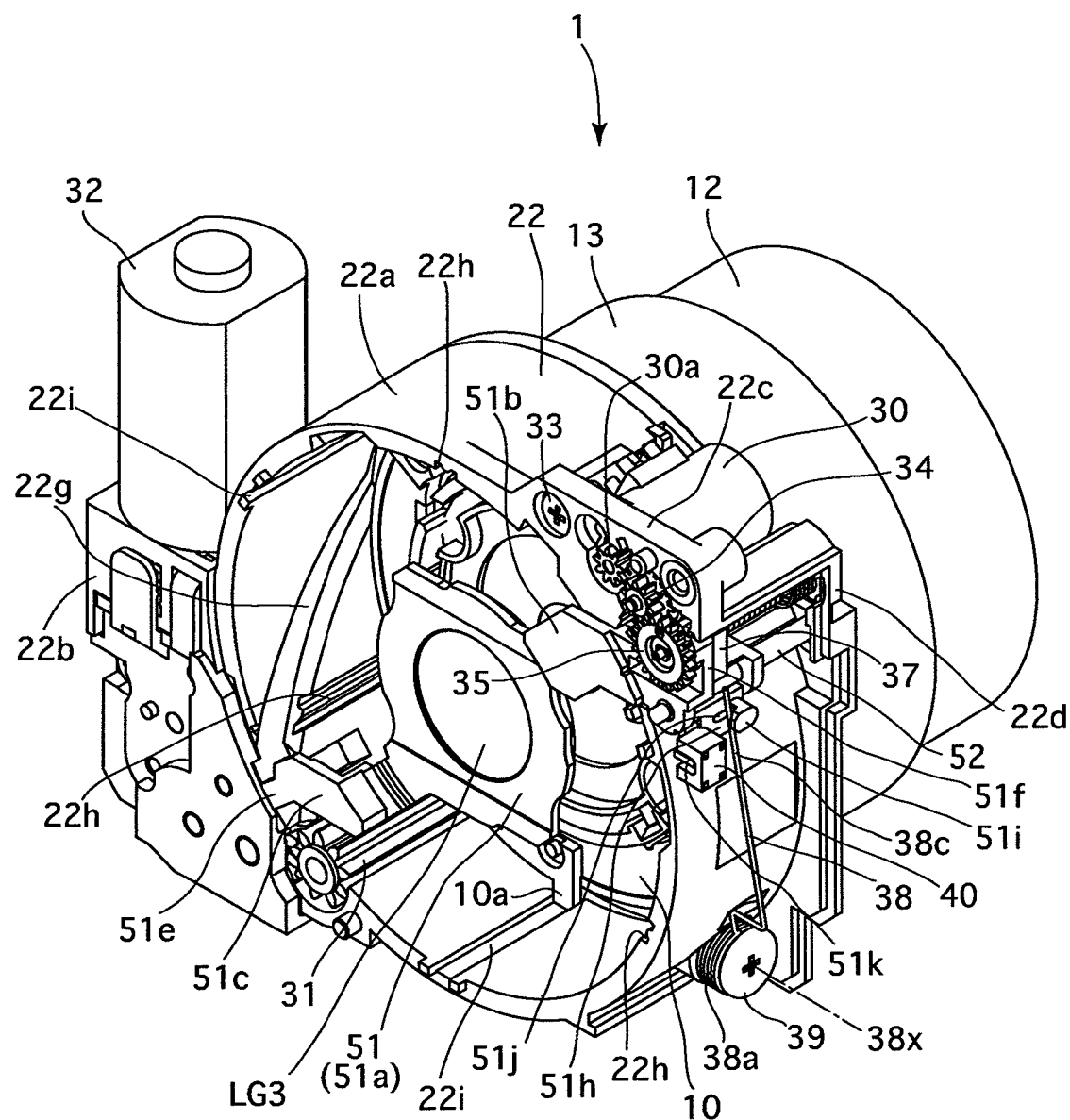
FIG. 6 is a rear perspective view of the zoom lens barrel in a ready-to-photograph state with the image-pickup device holder of the zoom lens barrel removed.
Figure 10:
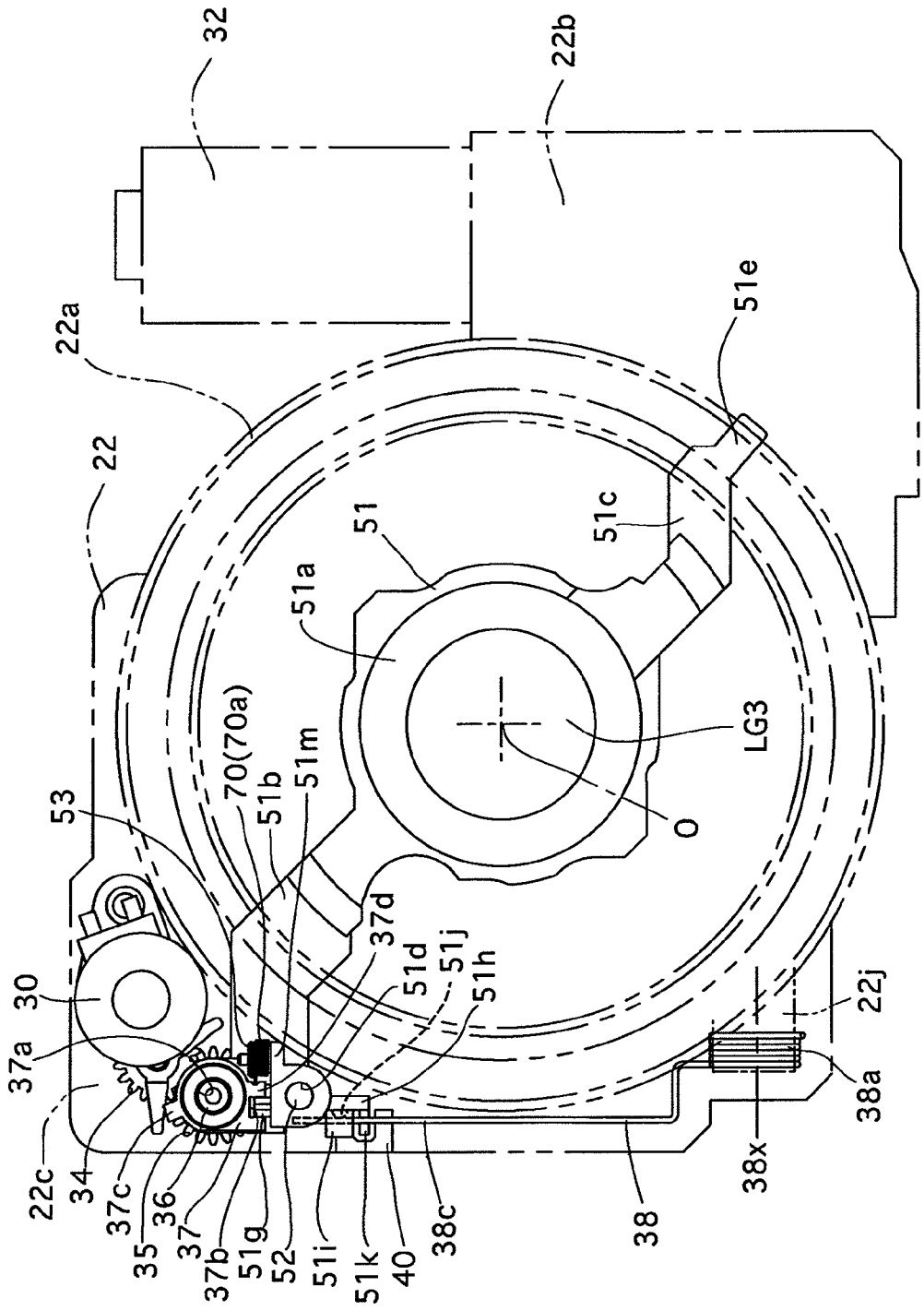
FIG. 10 is a front elevational view of the zoom lens barrel, mainly showing the third lens group frame and the optical element position control mechanism therefor.

The zoom lens barrel 1 is provided with a third lens group frame (optical element holding member) 51 which holds the third lens group LG3. The third lens group frame 51 is provided with a pair of guide arm portions 51b and 51c which are formed to extend from a central lens holding portion 51a of the third lens group frame 51 in substantially opposite radial directions, symmetrical with respect to the photographing optical axis O. The guide arm portion 51b is provided in the vicinity of the radially outer end thereof with a pair of guide holes (front and rear guide holes which align in the optical axis direction) 51d into which a third lens group guide shaft 52 is inserted to be freely slidable relative to the pair of guide holes 51d. The third lens group guide shaft 52 is fixed at the front and rear ends thereof to the stationary barrel 22 and the lens barrel back plate 23, respectively. As shown in FIGS. 6 and 10, the third lens group guide shaft 52 is positioned outside the cylindrical housing portion 22a of the stationary barrel 22, and the front end portion of the third lens group guide shaft 52 is supported by the front wall portion 22d. The rear end portion of the third lens group guide shaft 52 passes below the AF motor support portion 22c and is engaged in a shaft support hole (not shown) formed in the lens barrel back plate 23. In order to be guided by the third lens group guide shaft 52, the guide arm portion 51b of third lens group frame 51 is formed so that a portion of the guide arm portion 51b in the vicinity of the radially outer end thereof projects outwardly from the cylindrical housing portion 22a of the stationary barrel 22, and the cylindrical housing portion 22a is provided with an opening 22e (see FIG. 7) which allows the guide arm portion 51b to project outwardly from the cylindrical housing portion 22a. The third lens group frame 51 is provided at the radially outer end of the other guide arm portion 51c with an anti-rotation projection 51e, and the stationary barrel 22 is provided on an inner peripheral surface thereof with a linear guide groove 22f elongated in the optical axis direction in which the anti-rotation projection 51e is engaged to be freely slidable therein. The axis of the third lens group guide shaft 52 and the lengthwise direction of the linear guide groove 22f are parallel to the optical axis O, and the third lens group frame 51 is moved while being guided linearly in the optical axis direction with the guide holes 51d and the anti-rotation projection 51e being guided by the third lens group guide shaft 52 and the linear guide groove 22f, respectively. In addition, the third lens group frame 51 can be moved forward and rearward along the optical axis O by the AF motor 30. The drive mechanism for the third lens group frame 51 will be discussed later.

Figure 7:
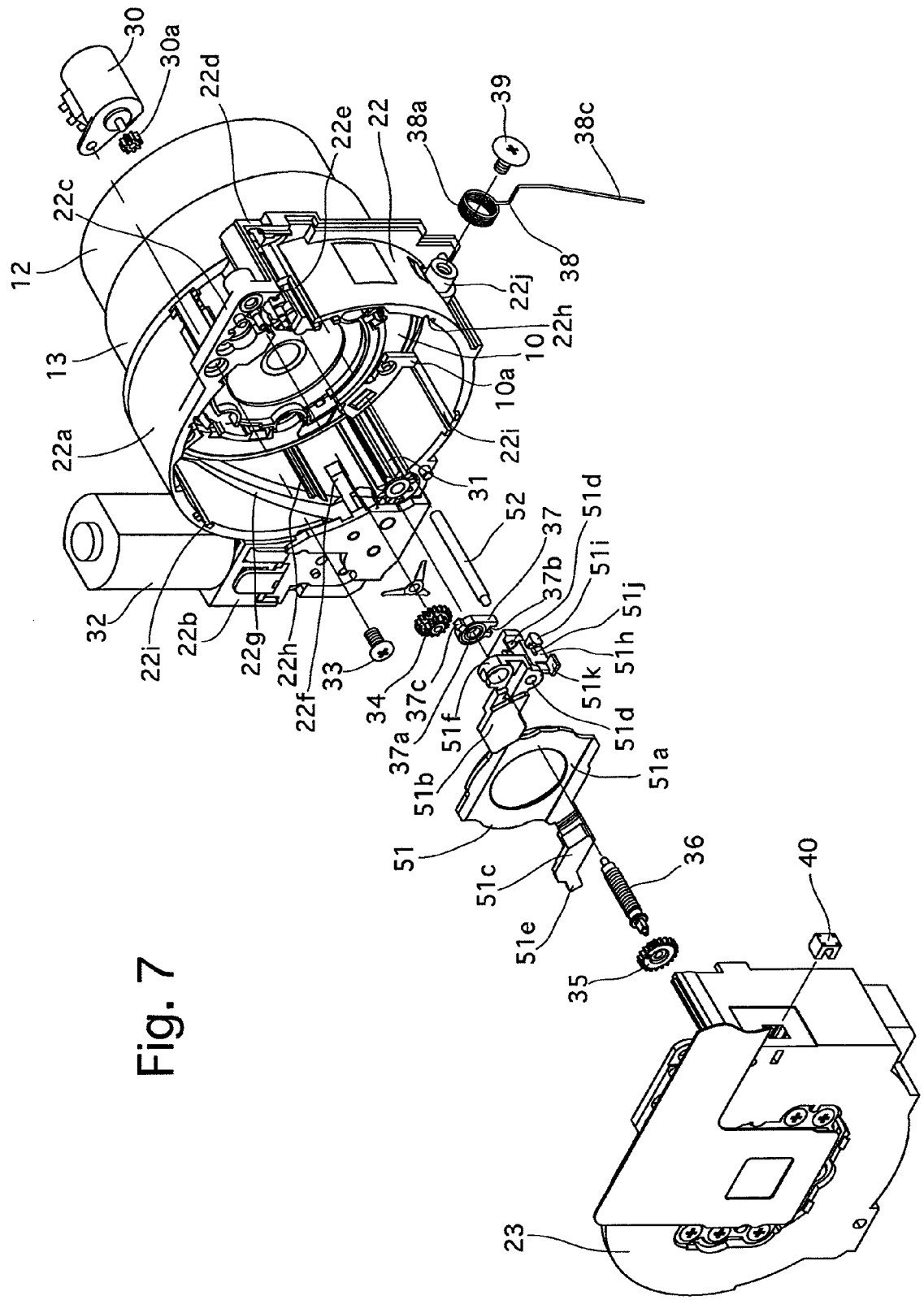
FIG. 7 is an exploded rear perspective view of the zoom lens barrel with elements thereof, which are associated with position control for the third lens group, removed.
Figure 8:
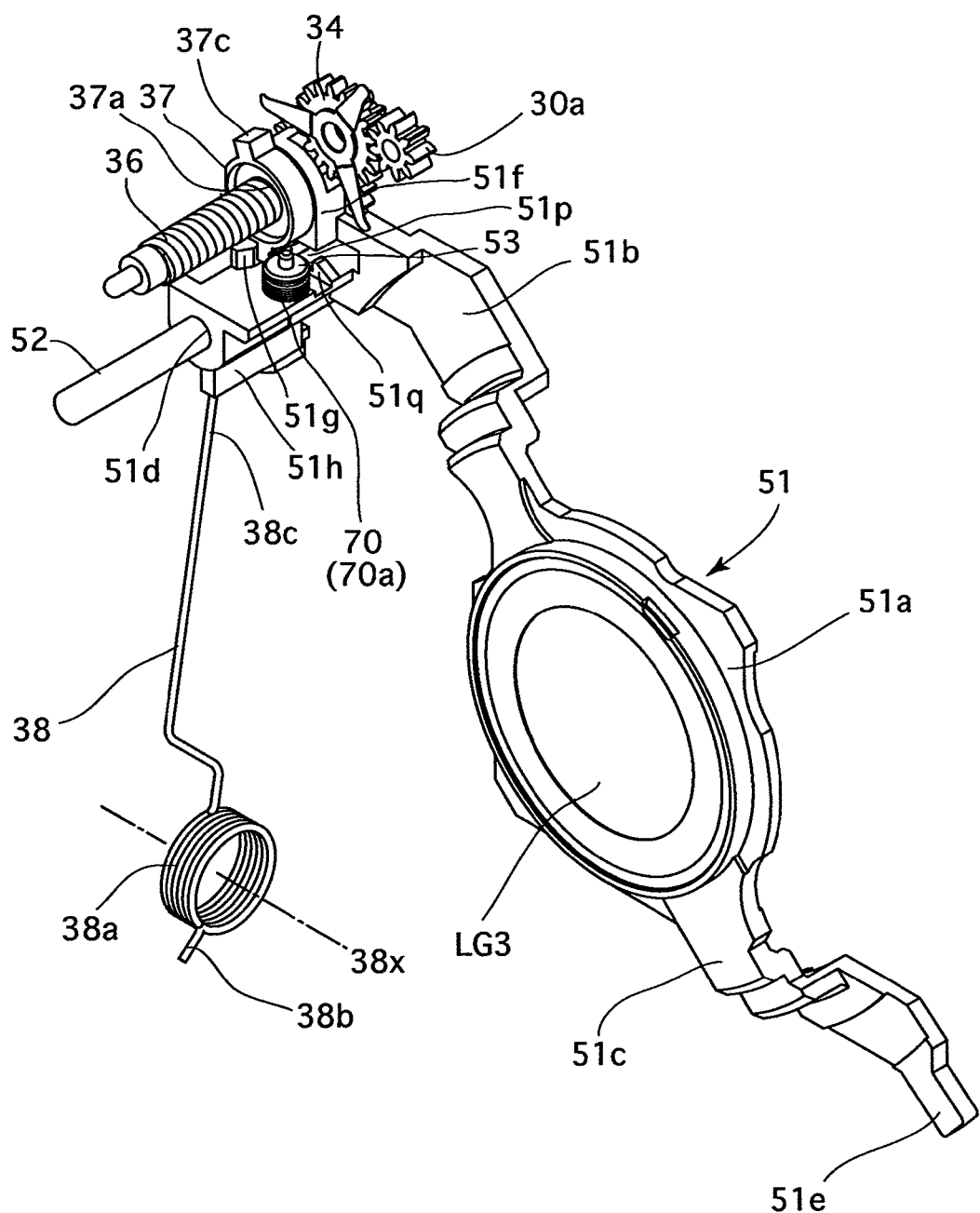
FIG. 8 is a front perspective view of the third lens group frame and main parts of the optical element position control mechanism therefor.
Figure 9:
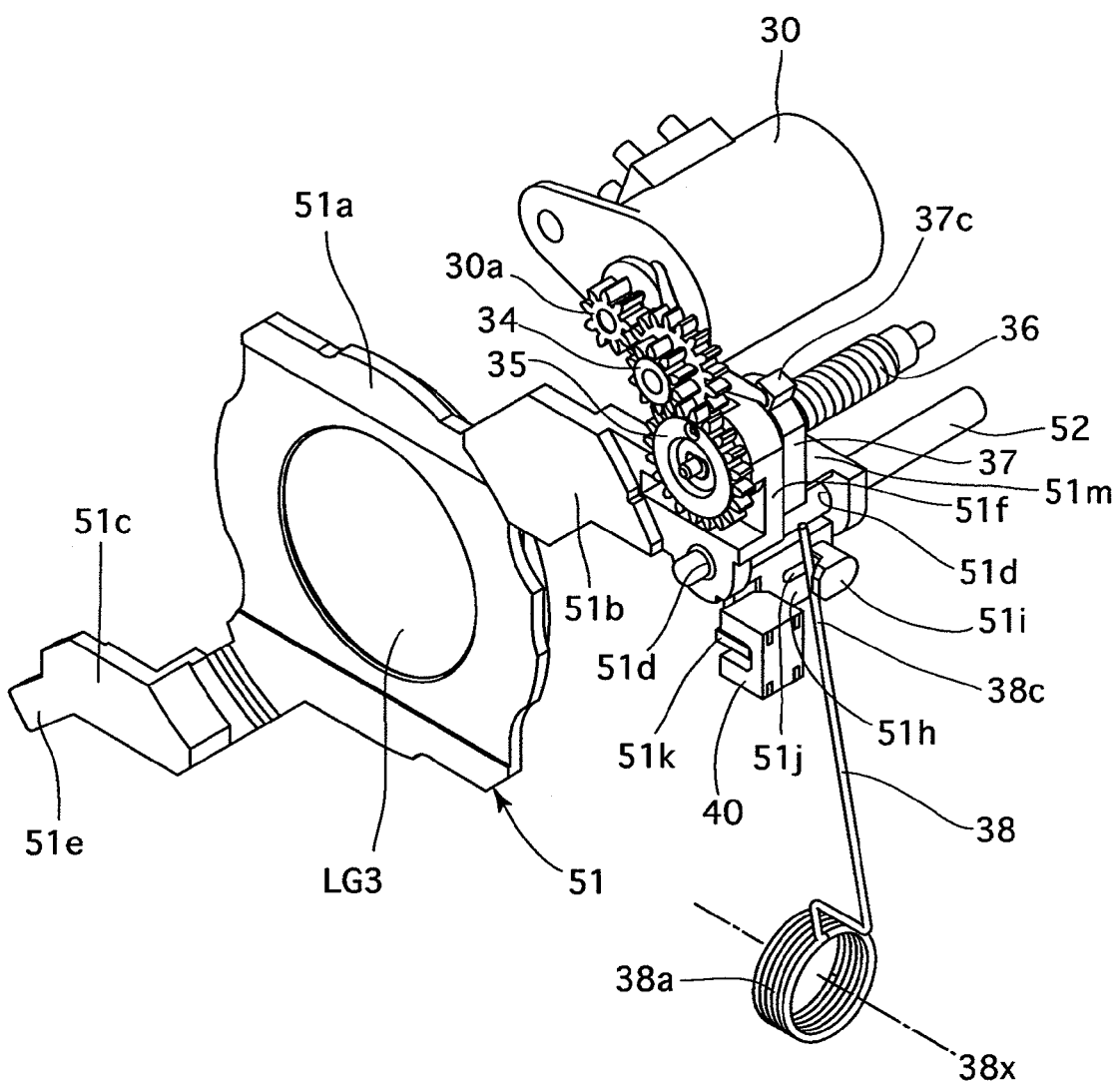
FIG. 9 is a rear perspective view of the third lens group frame and main parts of the optical element position control mechanism therefor.

The zoom lens barrel 1 is provided inside the zoom motor support portion 22b of the stationary barrel 22 with a reduction gear train which transfers the driving force of the zoom motor 32 to a zoom gear 31 (see FIGS. 6 and 7). The zoom lens barrel 1 is provided inside the cylindrical housing portion 22a with a cam ring 11, and the cam ring 11 is provided at the rear end thereof with an annular gear 11a which is in mesh with the zoom gear 31. The cam ring 11 is driven to rotate by the zoom motor 32 via the engagement of the annular gear 11a with the zoom gear 31. The cam ring 11 is provided on the annular gear 11a with a set of three guide projections 11b, and the stationary barrel 22 is provided on an inner peripheral surface of the cylindrical housing portion 22a with a set of three cam ring control grooves 22g in which the set of three guide projections 11b are slidably engaged, respectively. Each cam ring control groove 22g is composed of a lead groove portion and a circumferential groove portion positioned in front of the lead groove portion, wherein the lead groove portion is inclined with respect to the direction of the photographing optical axis O and the circumferential groove portion is formed solely from a circumferential component about the photographing optical axis O. Upon applying torque on the cam ring 11 via the zoom motor 32, when the zoom lens barrel 1 is in between the accommodated (fully-retracted) state shown in FIG. 1 and the wide-angle extremity state shown by an upper half of FIG. 2, the cam ring 11 moves in the optical axis direction while rotating with the guide projections 11b being respectively guided by the aforementioned lead groove portions of the cam ring control grooves 22g. More specifically, the cam ring 11 advances (toward the object side) in the optical axis direction while rotating when the zoom lens barrel 1 moves into the wide-angle extremity state (ready-to-photograph state) from the lens barrel accommodated state. Conversely, when the zoom lens barrel 1 moves into the lens barrel accommodated state from the wide-angle extremity state (ready-to-photograph state), the cam ring 11 retracts in the optical axis direction while rotating. On the other hand, when the zoom lens barrel 1 is in a ready-to-photograph state (in the zoom range) between the wide-angle extremity and the telephoto extremity, the guide projections 11b of the cam ring 11 are positioned in the aforementioned circumferential groove portions of the cam ring control grooves 22g so that the cam ring 11 rotates at a fixed position in the optical axis direction, i.e., without moving in the optical axis direction.

The zoom lens barrel 1 is provided with a first advancing barrel 13 and a linear guide ring 10 which are supported inside the cylindrical housing portion 22a with the cam ring 11 positioned between the first advancing barrel 13 and the linear guide ring 10. The first advancing barrel 13 is guided linearly in the optical axis direction by the engagement of linear guide projections 13a, which project radially outwards from the first advancing barrel 13, with linear guide grooves 22h which are formed on an inner peripheral surface of the cylindrical housing portion 22a, respectively, and the linear guide ring 10 is guided linearly in the optical axis direction by the engagement of linear guide projections 10a, which project radially outwards from the linear guide ring 10, with linear guide grooves 22i which are formed on an inner peripheral surface of the cylindrical housing portion 22a, respectively. Each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group moving frame 8 linearly in the optical axis direction by linear guide keys 10b (see FIG. 2) provided on the linear guide ring 10 which are positioned inside the cam ring 11. The zoom lens barrel 1 is provided inside the second lens group moving frame 8 with a second lens holding frame 6 which holds the second lens group LG2. The second lens holding frame 6 is integral with the second lens group moving frame 8. In addition, the first advancing barrel 13 is provided on an inner peripheral surface thereof with linear guide grooves 13b extending in the optical axis direction, and the second advancing barrel 12 is provided with linear guide projections 12a which project radially outwards to be slidably engaged in the linear guide grooves 13b, so that the second advancing barrel 12 is also guided linearly in the optical axis direction. The zoom lens barrel 1 is provided inside the second advancing barrel 12 with a first lens group holding frame 4 which holds the first lens group LG1.

The cam ring 11 is provided on an inner peripheral surface thereof with second-lens-group control cam grooves 11c, and the second lens group moving frame 8 is provided on an outer peripheral surface thereof with cam followers 8a, for moving the second lens group LG2, which are slidably engaged in the second-lens-group control cam grooves 11c, respectively. Since the second lens group moving frame 8 is guided linearly in the optical axis direction via the linear guide ring 10, a rotation of the cam ring 11 causes the second lens group moving frame 8 (the second lens group LG2) to move in the optical axis direction in a predetermined moving manner in accordance with the contours of the second-lens-group control cam grooves 11c.

The second advancing barrel 12 is provided with cam followers 12b, for moving the first lens group LG1, which project radially inwards, and the cam ring 11 is provided on an outer peripheral surface thereof with first-lens-group control cam grooves 11d in which the cam followers 12b are slidably engaged, respectively. Since the second advancing barrel 12 is guided linearly in the optical axis direction via the first advancing barrel 13, a rotation of the cam ring 11 causes the second advancing barrel 12 (the first lens group LG1) to move in the optical axis direction in a predetermined moving manner in accordance with the contours of the first-lens-group control cam grooves 11d.

The second lens group moving frame 8 and the second advancing barrel 12 are biased in opposite directions away from each other by an inter-lens-group biasing spring 27 to improve the degree of precision of the engagement between each cam follower 8a and the associated second-lens-control cam groove 11c and the degree of precision of the engagement between each cam follower 12b and the associated first-lens-group control cam groove 11d.

The zoom lens barrel 1 is provided inside the second lens group moving frame 8 with a shutter unit 15 including the shutter blades S which is supported by the second lens group moving frame 8. The zoom lens barrel 1 is provided behind the second lens group moving frame 8 with a rear-mounted limit member 5, and the second lens group moving frame 8 and the rear-mounted limit member 5 are provided with a guide projection 8b and a guide projection 5a, respectively, constituting a pair of projections which project in directions toward each other along a direction parallel to the photographing optical axis O. The shutter unit 15 is supported by the two guide projections 8b and 5a to be slidable thereon in the optical axis direction.

A decorative plate 16 having a photographing aperture 16a is fixed to the front end of the second advancing barrel 12, and the zoom lens barrel 1 is provided immediately behind the decorative plate 16 with a set of protective barrier blades 17 which opens and shuts the photographing aperture 16a that is positioned in front of the first lens group LG1.

Operations of the zoom lens barrel 1 that has the above described structure will be discussed hereinafter. In the lens barrel accommodated state shown in FIGS. 1, 3 and 4, the length of the optical system in the optical axis direction (the distance from the front surface (object-side surface) of the first lens group LG1 to the imaging surface of the CCD image sensor 24) is shorter than that in a ready-to-photograph state shown in FIGS. 2, 5 and 6. In the lens barrel accommodated state, upon a state transitional signal for a transition from the lens barrel accommodated state to a ready-to-photograph state being issued (e.g., upon a main switch of the camera to which the zoom lens barrel 1 is mounted being turned ON), the zoom motor 32 is driven in the lens barrel advancing direction. This causes the zoom gear 31 to rotate, thus causing the cam ring 11 to move forward in the optical axis direction while rotating with the guide projections 11b being guided by the lead groove portions of the cam ring control grooves 22g, respectively. The linear guide ring 10 and the first advancing barrel 13 linearly move forward with the cam ring 11. This rotation of the cam ring 11 causes the second lens group moving frame 8 to move in the optical axis direction in a predetermined moving manner due to the engagement between the cam followers 8a and the second-lens-group control cam grooves 11c. In addition, the rotation of the cam ring 11 causes the second advancing barrel 12, which is guided linearly in the optical axis direction via the first advancing barrel 13, to move in the optical axis direction in a predetermined moving manner due to the engagement between the cam followers 12b and the first-lens-group control cam grooves 11d.

The amount of advancement of the first lens group LG1 from the lens barrel accommodated state is determined by the sum of the amount of forward movement of the cam ring 11 relative to the stationary barrel 22 and the amount of advancement of the second advancing barrel 12 relative to the cam ring 11. The amount of advancement of the second lens group LG2 from the lens barrel accommodated state is determined by the sum of the amount of forward movement of the cam ring 11 relative to the stationary barrel 22 and the amount of advancement of the second lens group moving frame 8 relative to the cam ring 11. A zooming operation is carried out by moving the first lens group LG1 and the second lens group LG2 on the photographing optical axis O while changing the air distance between the first lens group LG1 and the second lens group LG2. Driving the zoom motor 32 in a barrel-advancing direction so as to advance the zoom lens barrel from the lens barrel accommodated state shown in FIG. 1 firstly causes the zoom lens barrel 1 to move to the wide-angle extremity shown in the upper half of the cross sectional view in FIG. 2, and further driving the zoom motor 32 in the same direction causes the zoom lens barrel 1 to move to the telephoto extremity shown in the lower half of the cross sectional view in FIG. 2. In the zooming range between the telephoto extremity and the wide-angle extremity, the cam ring 11 only performs the above described fixed-position rotating operation while the guide projections 11$b$ are engaged in the circumferential groove portions of the cam ring control grooves 22$g$ of the stationary barrel 22, respectively, thus not moving either forward or rearward in the optical axis direction. Upon the main switch being turned OFF, the zoom motor 32 is driven in the lens barrel retracting direction, which causes the zoom lens barrel 1 to perform a lens barrel retracting operation reverse to the above described lens barrel advancing operation, thus returning the zoom lens barrel 1 to the lens barrel accommodated state shown in FIG. 1.

Figure 2:
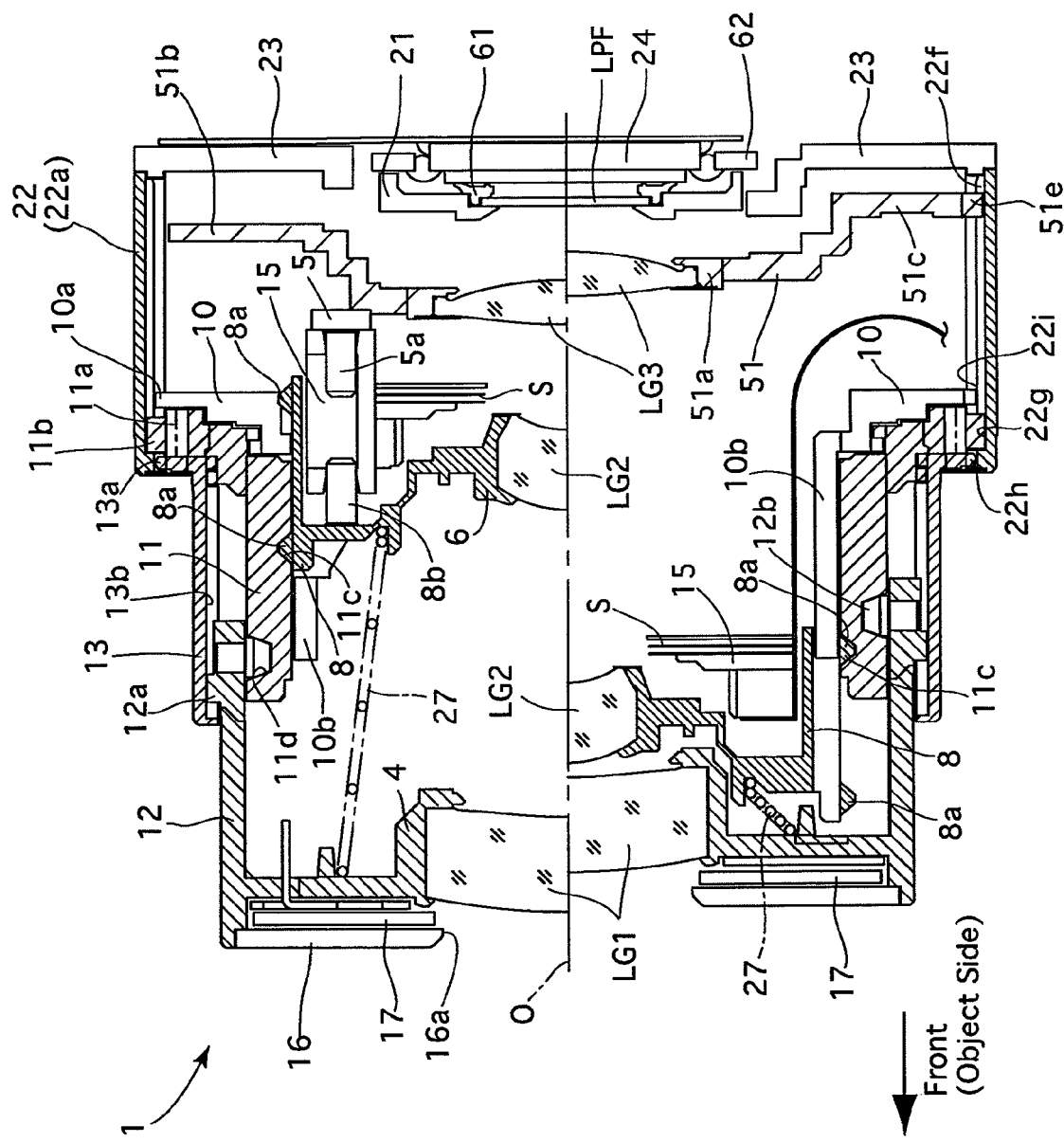
FIG. 2 is a cross sectional view of the zoom lens barrel in a ready-to-photograph state, wherein an upper half and a lower half thereof show the zoom lens barrel set at the wide-angle extremity and the telephoto extremity, respectively.
Figure 3:
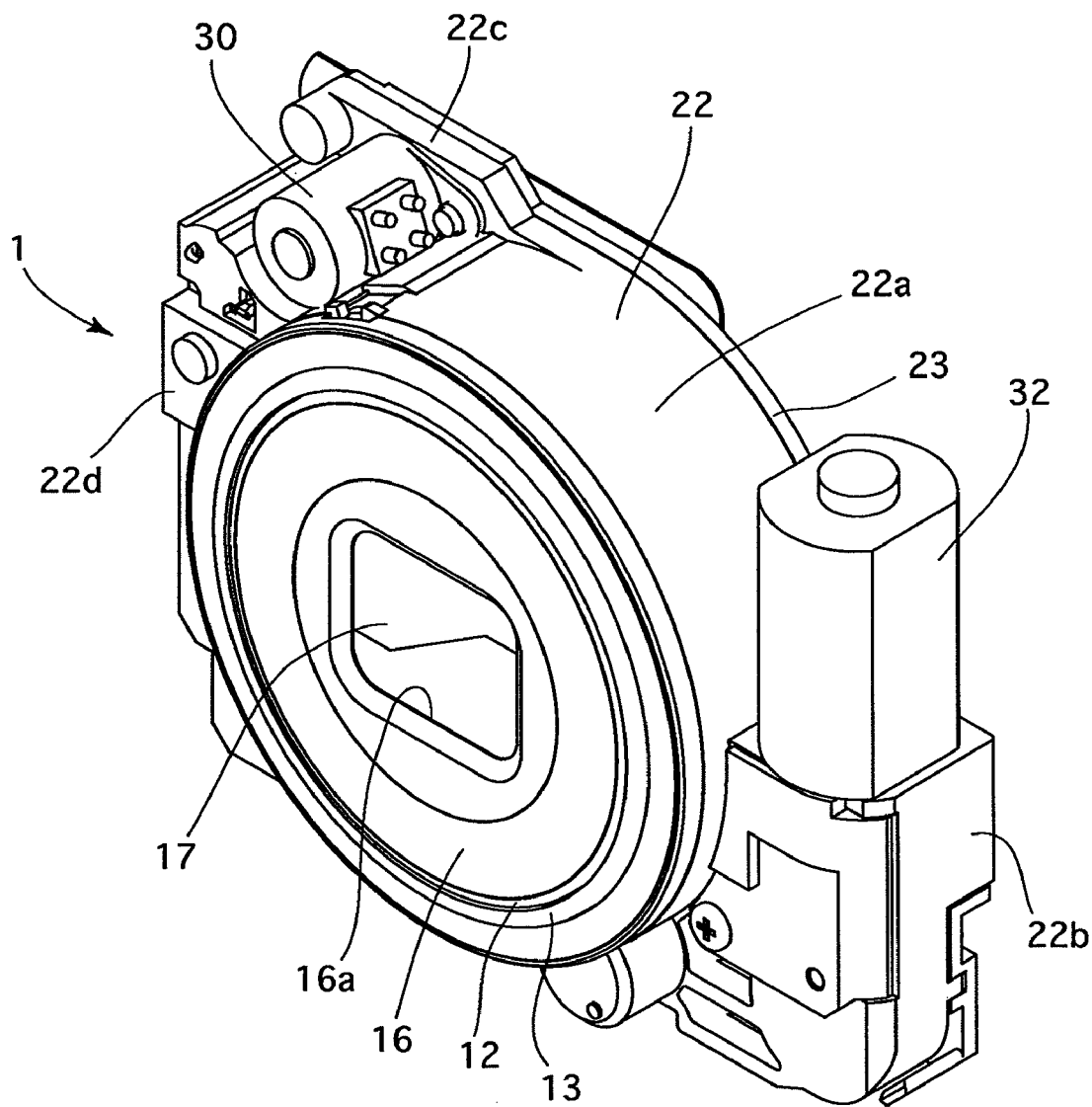
FIG. 3 is a front perspective view of the zoom lens barrel in the lens barrel accommodated state.
Figure 4:
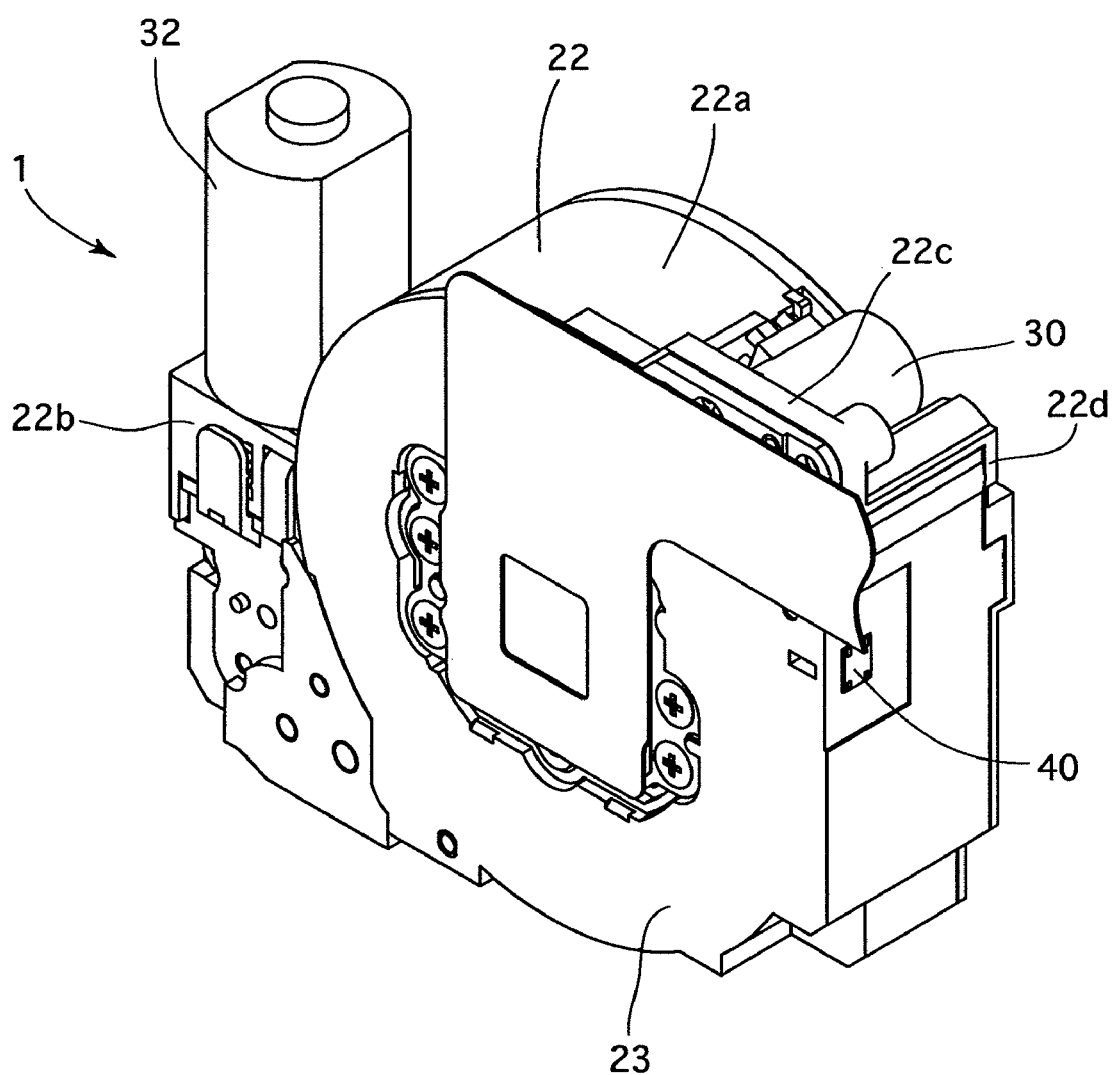
FIG. 4 is a rear perspective view of the zoom lens barrel in the lens barrel accommodated state.
Figure 5:
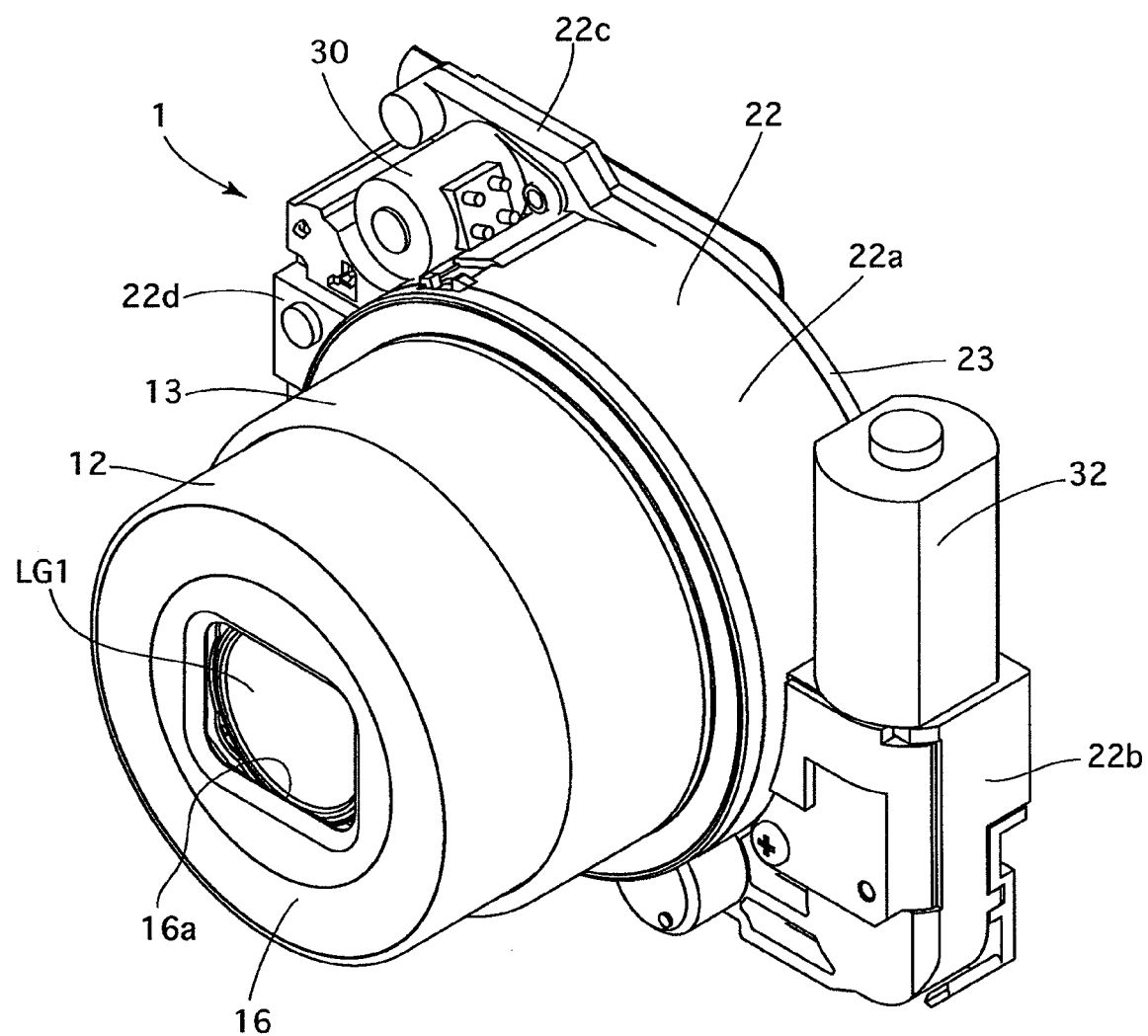
FIG. 5 is a front perspective view of the zoom lens barrel is in a ready-to-photograph state.

The set of shutter blades S are positioned behind the second lens group LG2 when the zoom lens barrel 1 is in a ready-to-photograph state as shown in FIG. 2. When the zoom lens barrel 1 moves from a ready-to-photograph state to the lens barrel accommodated state that is shown in FIG. 1, the shutter unit 15 is moved forward relative to the second lens group moving frame 8 in the optical axis direction so that a part of the second lens group LG2 and the set of shutter blades S lie in a plane orthogonal to the optical axis O.

The third lens group frame 51 that supports the third lens group LG3 can be moved forward and rearward in the optical axis direction by the AF motor 30 independently of the above described driving operations of the first lens group LG1 and the second lens group LG2 that are performed by the zoom motor 32. When the zoom lens barrel 1 is in a ready-to-photograph state at any focal length from the wide-angle extremity to the telephoto extremity, the third lens group frame 51 that supports the third lens group LG3 is moved along the optical axis direction to perform a focusing operation by driving the AF motor 30 in accordance with object distance information obtained by a distance measuring device (not shown) provided in, e.g., the camera to which the zoom lens barrel 1 is mounted.

The details of the optical element position control mechanism for controlling the position of the third lens group frame 51 (i.e., the position of the third lens group LG3) will be discussed hereinafter. As described above, the AF motor support portion 22$c$ is formed on the stationary barrel 22 so as to be positioned outside the cylindrical housing portion 22$a$, and the front wall portion 22$d$ is formed on the stationary barrel 22 so as to be positioned in front of and face the AF motor support portion 22$c$. The AF motor 30 is fixed to the front of the AF motor support portion 22$c$ by a set screw 33 so that a pinion 30$a$ fixed on the rotary shaft of the AF motor 30 projects rearward from the back surface of the AF motor support portion 22$c$. A reduction gear 34 which is engaged with the pinion 30$a$ and a driven gear 35 which is engaged with the reduction gear 34 are rotatably supported on a back surface of the AF motor support portion 22$c$. The driven gear 35 is fixed to the rear end of a lead screw 36. Rotation of the rotary shaft of the AF motor 30 is transferred to the lead screw 36, via the pinion 30$a$, the reduction gear 34 and the driven gear 35 which constitute a reduction gear train of AF drive mechanism. The front and rear ends of the lead screw 36 are fitted in a front shaft hole and a rear shaft hole 23$b$ which are formed in the front wall portion 22$d$ of the stationary barrel 22 and the lens barrel back plate 23 to be rotatably supported thereby, respectively, so that the lead screw 36 can rotate on an axis of rotation substantially parallel to the photographing optical axis O.

Figure 11:
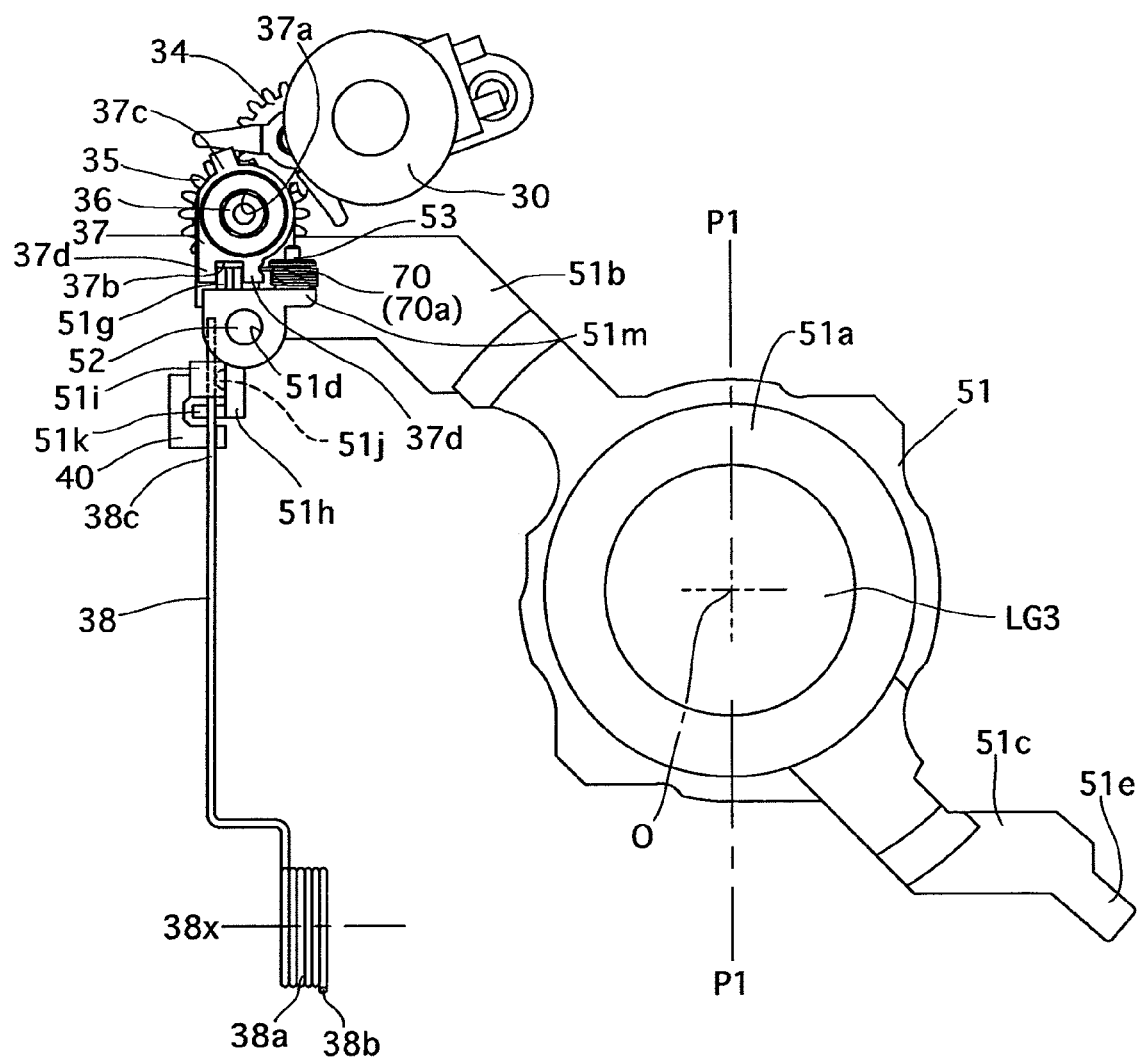
FIG. 11 is a front elevational view of the third lens group frame and the optical element position control mechanism therefor that are shown in FIG. 10.

The third lens group frame 51 is provided at the radially outer end of the guide arm portion 51$b$ with a nut abutting portion 51$f$. A through-hole into which the lead screw 36 is inserted is formed through the nut abutting portion 51$f$. An AF nut (linearly moving nut) 37 having a screw hole 37$a$ in which the lead screw 36 is screw-engaged is installed in front of the nut abutting portion 51$f$. The AF nut 37 is prevented from rotating by the engagement of an anti-rotation recess 37$b$ of the AF nut 37 with an anti-rotation projection (rotation prevention device) 51$g$ (see FIGS. 10 and 11) of the third lens group frame 51 and the engagement of an anti-rotation projection (rotation prevention device) 37$c$ of the AF nut 37 with an anti-rotation recess (not shown) formed in the stationary barrel 22. Rotating the lead screw 36 forward and reverse causes the AF nut 37 to move forward and rearward in the optical axis direction without rotating with the lead screw 36. The third lens group frame 51 is provided, in the vicinity of the radially outer end of the guide arm portion 51$b$ between the pair of guide holes 51$d$, with an upright wall portion 51$h$ which is formed in a flat shape substantially parallel to the photographing optical axis O. The third lens group frame 51 is provided on the upright wall portion 51$h$ with a spring hook (projection) 51$i$ which projects laterally from the upright wall portion 51$h$. The spring hook 51$i$ is formed in an L-shaped projection which is bent so that the front end faces rearwardly in the optical axis direction. The third lens group frame 51 is provided, behind the spring hook 51$i$ on a side of the upright wall portion 51$h$, with a semicircular-cross-sectional portion 51$j$.

The zoom lens barrel 1 is provided therein with a third lens group biasing spring 38 serving as a biasing device which gives the third lens group frame 51 a biasing force in a direction to move the third lens group frame 51 along the photographing optical axis O. The third lens group biasing spring 38 has a coiled portion 38$a$. The coiled portion 38$a$ is supported by a spring support projection 22$j$ formed on the stationary barrel 22. The spring support projection 22$j$ is shaped into a cylindrical projection and formed on an outer surface of the cylindrical housing portion 22$a$ with the axis of the spring support projection 22$j$ extending in a direction substantially orthogonal to the optical axis direction. The coiled portion 38$a$ of the third lens group biasing spring 38 is held onto the cylindrical outer surface of the spring support projection 22$j$ while being prevented from slipping off the spring support projection 22$j$ by screwing a set screw 39 in a screw hole formed through the center of the spring support projection 22$j$. The central axis of the coiled portion 38$a$ held onto the spring support projection 22$j$ is substantially coincident with the central axis of the spring support projection 22$j$.

Figure 12:
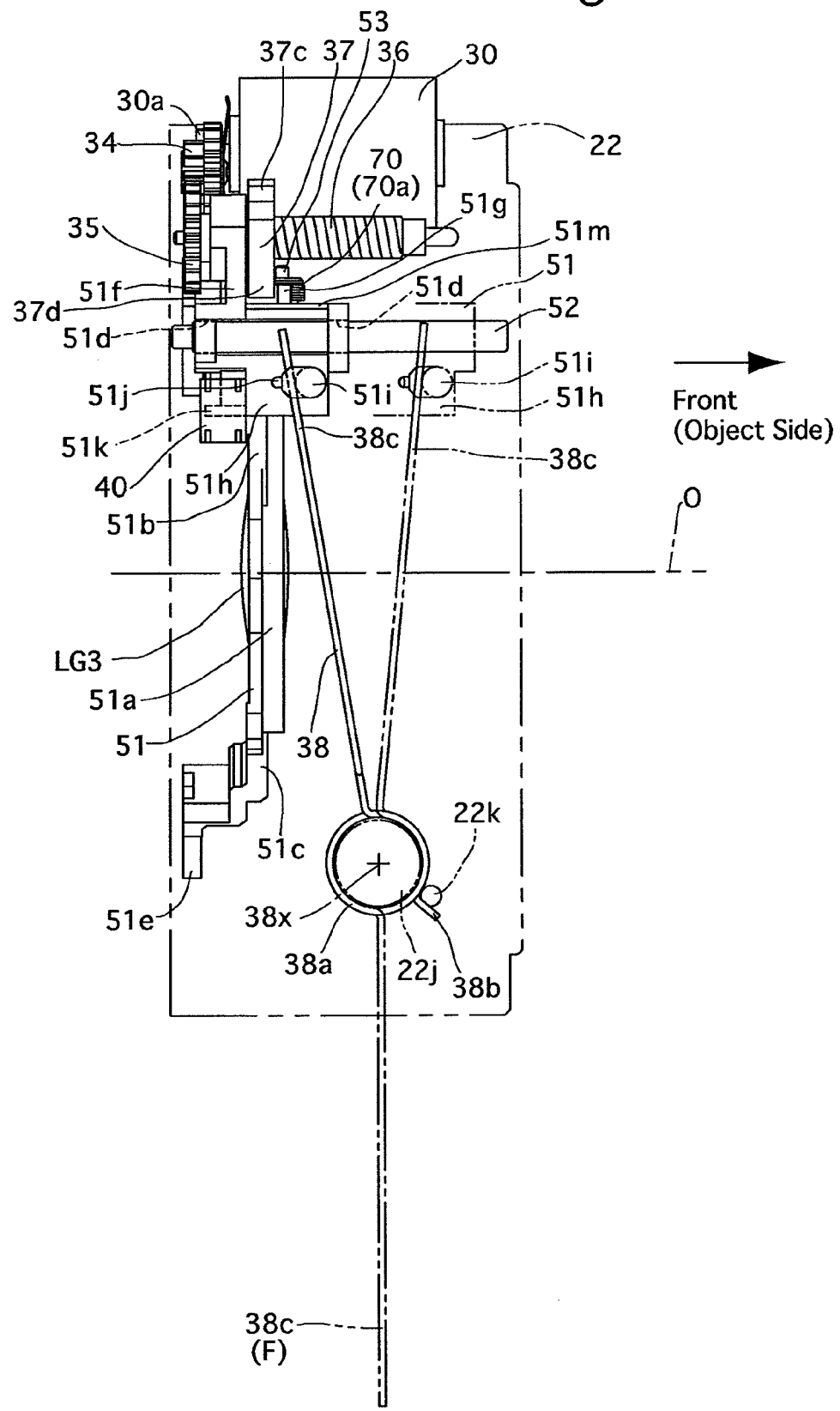
FIG. 12 is a side elevational view of the third lens group frame and the optical element position control mechanism therefor, showing the operation of the torsion spring of the optical element position control mechanism that biases the third lens group frame.

The third lens group biasing spring 38 is provided with a short support arm portion 38b and a long biasing arm portion 38c, each of which projects radially outward from the coiled portion 38a. The short support arm portion 38b is hooked onto a spring hook (projection) 22k (see FIG. 12) which is formed on the stationary barrel 22 in the vicinity of the spring support projection 22j. On the other hand, the free end of the biasing arm portion 38c is hooked onto the spring hook 51i of the third lens group frame 51. The upright wall portion 51h and the semicircular-cross-sectional portion 51j of the third lens group frame 51 prevent the biasing arm portion 38c from coming in contact with any nearby parts other than the spring hook 51i upon the biasing arm portion 38c being brought into engagement with the spring hook 51i. The biasing arm portion 38c serves as a force-applying portion capable of swinging about a swing axis 38x (fulcrum) substantially coincident with the axis of the coiled portion 38a (i.e., capable of swinging in a swing plane substantially parallel to the photographing optical axis O). In other words, the biasing arm portion 38c is swingable about the swing axis 38x which is substantially orthogonal to the photographing optical axis O. When in a free state where the biasing arm portion 38c is not hooked onto the spring hook 51i, the biasing arm portion 38c extends vertically downward from the coiled portion 38a with respect to. FIG. 12 as shown by a two-dot chain line designated by a reference numeral 38c(F) in FIG. 12. From this state, by rotating the biasing arm portion 38c counterclockwise by a substantially half rotation with respect to 38c(F) of FIG. 12 and hooking a portion of the biasing arm portion 38c at the free end thereof onto the rear surface of the spring hook 51i in the optical axis direction, the amount of resilient deformation (twist) of the third lens group biasing spring 38 increases, and the resilience of the third lens group biasing spring 38 acts as a load on the spring hook 51i which makes the biasing arm portion 38c press against the spring hook 51i in a direction toward the front of the optical axis direction. Namely, the third lens group biasing spring 38 comes into a force-applying state in which a biasing force of the third lens group biasing spring 38 toward the front in the optical axis direction is applied to the third lens group frame 51 via the biasing arm portion 38c.

In this manner, the third lens group frame 51, to which a forward biasing force in the optical axis direction is applied by the third lens group biasing spring 38, is prevented from moving forward by the abutment of the nut abutting portion 51f against the AF nut 37. Namely, as shown in FIGS. 8, 9, 12 and 15, the third lens group frame 51 is held with the nut abutting portion 51f being in contact with the AF nut 37 by the biasing force of the third lens group biasing spring 38, and the position of the third lens group frame 51 in the optical axis direction is determined according to the AF nut 37. Since the AF nut 37 is moved forward and rearward in the optical axis direction via the lead screw 36 by rotating the pinion 30a of the AF motor 30 forward and reverse as described above, the position of the third lens group frame 51 in the optical axis direction is thus controlled in accordance with the driving direction and the driving amount of the AF motor 30. For instance, if the AF nut 37 is moved forward by the AF motor 30, the third lens group frame 51 follows the forward movement of the AF nut 37 via the biasing force of the third lens group biasing spring 38 so as to move forward by the amount of the forward movement of the AF nut 37. Conversely, if the AF nut 37 is moved rearward from the forward moved position thereof, the AF nut 37 presses the nut abutting portion 51f rearward, so that the third lens group frame 51 is moved rearward against the biasing force of the third lens group biasing spring 38.

An origin position sensor 40 for detecting the limit of rearward movement of the third lens group frame 51 in the optical axis direction that is moved by the AF motor 30 is installed in the stationary barrel 22. The origin position sensor 40 is made of a photo-interrupter which includes a body having a U-shaped cross section with a light emitter and a light receiver which are provided thereon so as to face each other with a predetermined distance therebetween, and it is detected that the third lens group frame 51 is positioned at the limit of rearward movement thereof when a sensor interrupt plate 51k formed integral with the third lens group frame 51 passes between the light emitter and the light receiver. The AF motor 30 is a stepping motor. The amount of movement of the third lens group LG3 when a focusing operation is performed is calculated as the number of steps for driving the AF motor 30 with the limit of rearward movement being taken as the point of origin.

In FIG. 12, the limit of rearward movement of the third lens group frame 51 in the range of movement thereof that is controlled by the AF motor 30 is shown by a solid line, and the limit of forward movement of the third lens group frame 51 in the same range of movement thereof is shown by a two-dot chain line.

The mechanism for biasing the third lens group frame 51 by the torsion spring 38 in the above described embodiment of the optical element position control mechanism can reduce load on the AF motor 30 to thereby achieve a reduction in power consumption of the AF motor 30 while contributing to miniaturization of the zoom lens barrel 1, especially to a reduction of the length of the zoom lens barrel 1 in the accommodated state. However, in the present invention, the device for biasing the optical element holding member which corresponds to the third lens group frame 51 is not limited to the type of spring such as the third lens group biasing spring 38.

Figure 13:
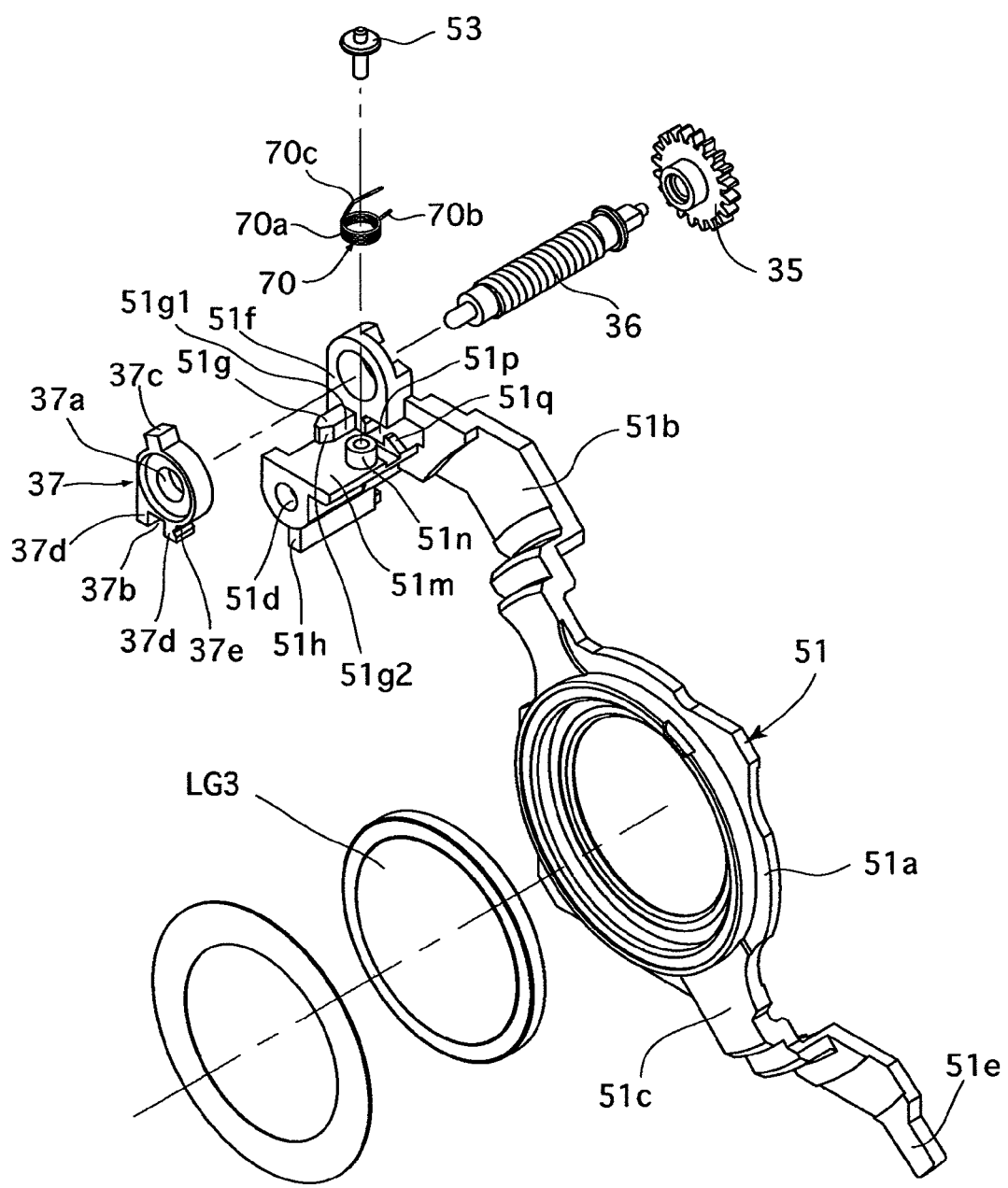
FIG. 13 is an exploded perspective view of the third lens group frame and main parts of the optical element position control mechanism therefor.
Figure 14:
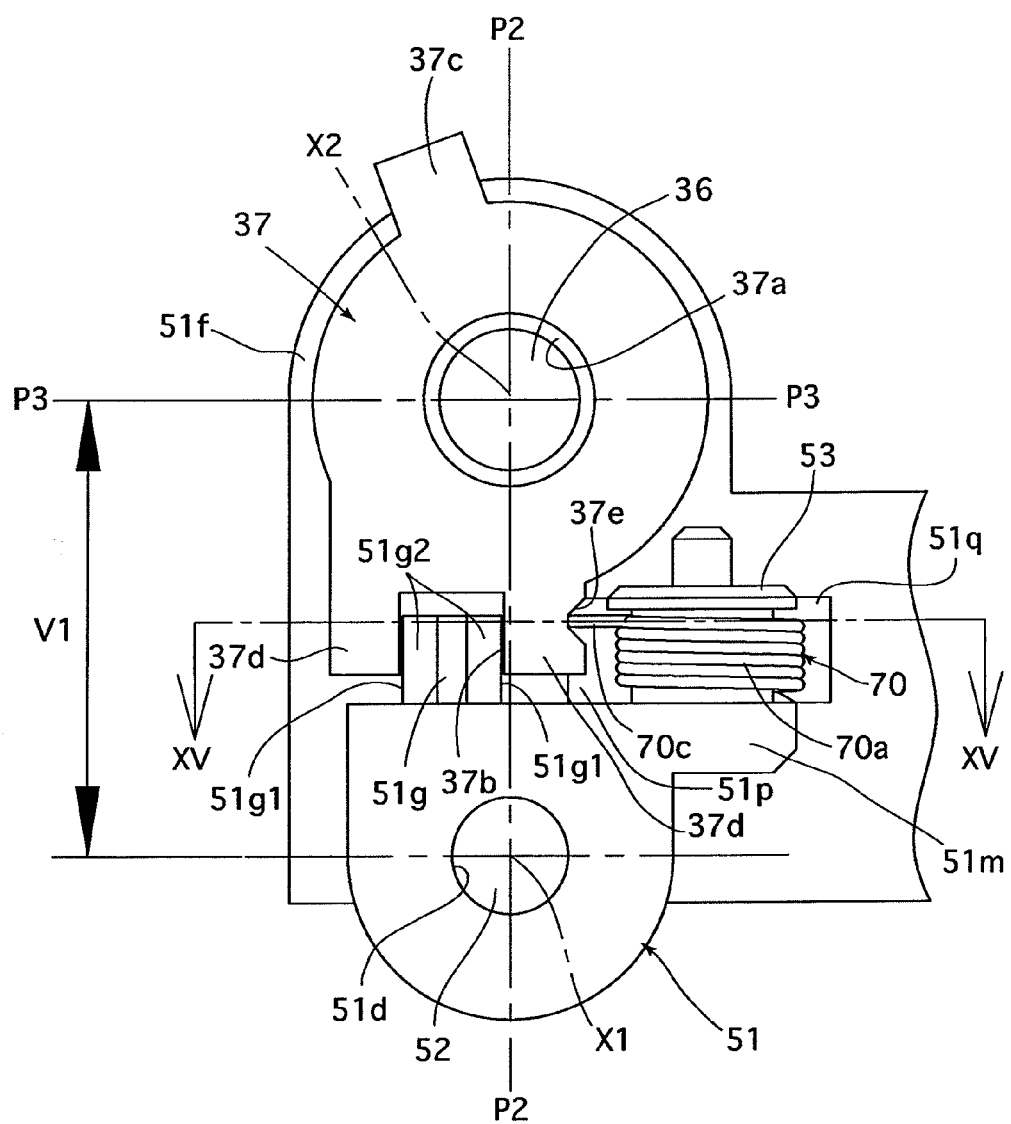
FIG. 14 is an enlarged front elevational view of a portion of the optical element position control mechanism in the vicinity of an AF nut serving as an element thereof.
Figure 15:
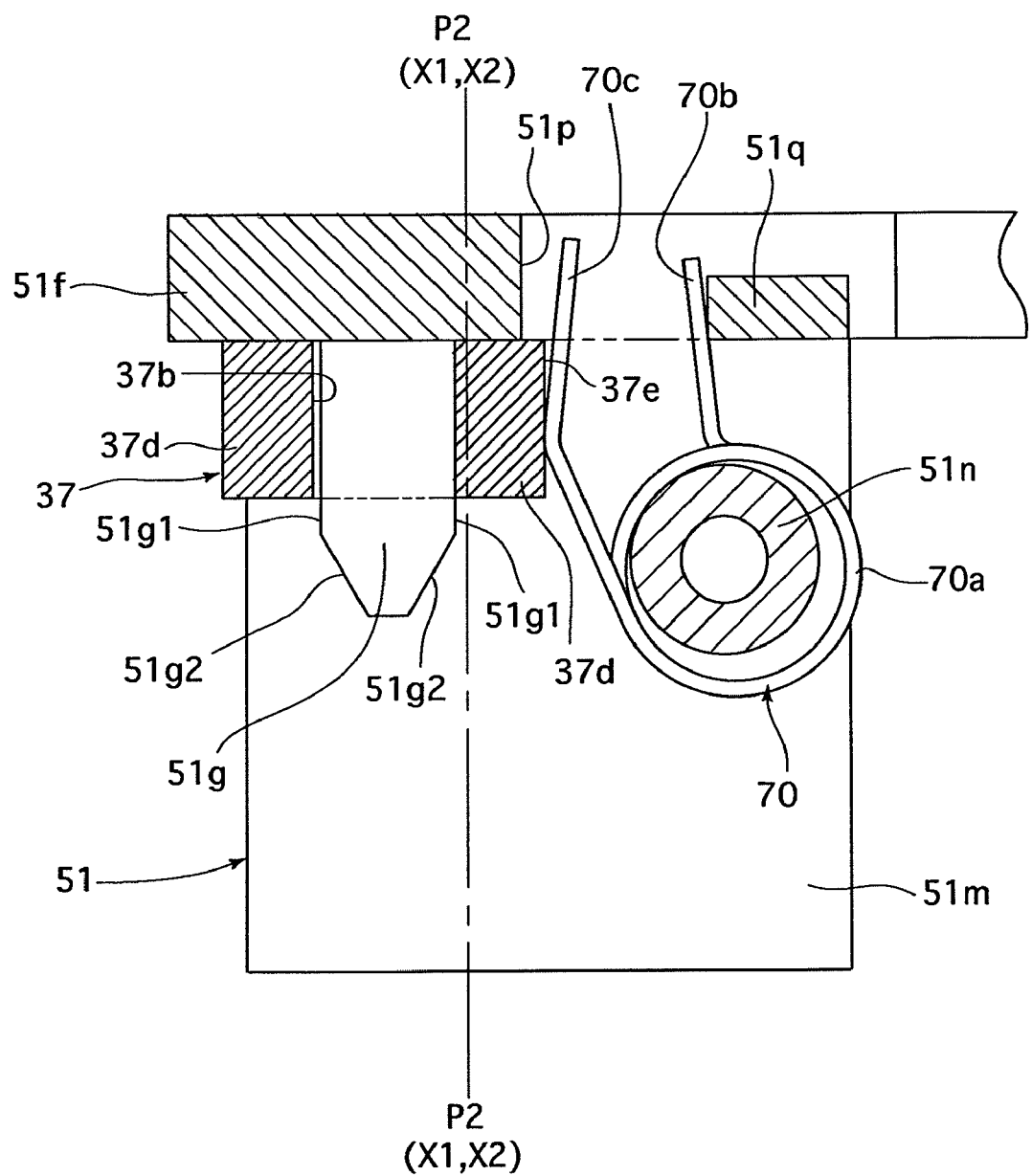
FIG. 15 is a cross sectional view of a portion of the optical element position control mechanism in the vicinity of an anti-rotation portion thereof for the AF nut, taken along the line XV-XV shown in FIG. 14.

The relationship between the third lens group frame 51 and the AF nut 37 will be further discussed in detail hereinafter. As shown in FIGS. 13 through 15, the third lens group frame 51 is provided on the upright wall portion 51h with a top surface portion 51m which is formed to be substantially orthogonal to the upright wall portion 51h, the nut abutting portion 51f is formed on the top surface portion 51m to extend upward, and the anti-rotation projection 51g is provided at the boundary between the nut abutting portion 51f and the top surface portion 51m. The third lens group frame 51 is provided, on the top surface portion 51m at a position laterally adjacent to the anti-rotation projection 51g, with a hollow-cylindrical spring support boss 51n, and is provided behind the spring support boss 51n with a spring insertion hole 51p and an engaging wall portion 51q. The spring insertion hole 51p is formed as a cut-out part of the lower end of the nut abutting portion 51f.

As described above, the anti-rotation projection 51g prevents the AF nut 37 from rotating and is provided on both lateral sides thereof with two rotation prevention surfaces (rotation prevention device) 51g1, respectively, which extend parallel to an axis X1 (see FIG. 14) of the third lens group guide shaft 52 and a rotational axis X2 (see FIG. 14) of the lead screw 36. The axis X1 of the third lens group guide shaft 52 and the rotational axis X2 of the lead screw 36 are parallel to each other and substantially the same distance away from a vertical plane P1 (see FIG. 11) in which the photographing optical axis O lies. When viewed in plan view as shown in FIG. 15, the axis X1 of the third lens group guide shaft 52 and the rotational axis X2 of the lead screw 36 are positioned to be overlaid on each other (i.e., coincide) in a plane P2 which is parallel to the vertical plane P1. The front end of the anti-rotation projection 51g is tapered forward to be provided with a pair of beveled surfaces 51g2. The pair of beveled surfaces 51g2 are formed to be continuous with the two rotation prevention surfaces 51g1, respectively, and the distance between the pair of beveled surfaces 51g2 gradually decreases in the forward direction, away from the two rotation prevention surfaces 51g1. On the other hand, the AF nut 37 is provided at the bottom thereof with a pair of anti-rotation legs (rotation prevention device) 37d which are spaced apart from each other by a distance corresponding to the distance between the two rotation prevention surfaces 51g1 of the anti-rotation projection 51g. The space surrounded by (positioned between) the pair of anti-rotation legs 37d corresponds to the anti-rotation recess 37b of the AF nut 37, which is engaged with the anti-rotation projection 51g. The pair of beveled surfaces 51g2 serves as a device for allowing the anti-rotation recess 37b of the AF nut 37 to be easily engaged with the anti-rotation projection 51g while preventing the anti-rotation projection 51g and the pair of anti-rotation legs 37d from interfering with each other when the anti-rotation recess 37b of the AF nut 37 and the anti-rotation projection 51g are brought into engagement with each other.

A biasing spring (biasing device) 70 is installed between the AF nut 37 and the third lens frame 51. The biasing spring 70 applies a biasing force against the anti-rotation projection 51g and the AF nut 37 in a direction to prevent the AF nut 37 from rotating to reduce slight vibrations (rattles) of the AF nut 37. The biasing spring 70 is a metal torsion spring which includes a helical and cylindrical coiled portion 70a and two arm portions: a first arm portion 70b and a second arm portion 70c which extend from the coiled portion 70a. The coiled portion 70a of the biasing spring 70 is fitted on the spring support boss 51n. A spring retaining member 53 with a flange which is greater in diameter than the spring support boss 51n is fixed to the spring support boss 51n to prevent the coiled portion 70a of the biasing spring 70 from coming off the spring support boss 51n. The biasing spring 70, which is supported by the third lens group frame 51 thereon via the spring support boss 51n and the spring retaining member 53, is positioned so that the axis of the coiled portion 70a extends substantially parallel to the plane P2 (see FIGS. 14 and 15) which includes the axis X1 of the third lens group guide shaft 52 and the rotational axis X2 of the lead screw 36. In other words, the axis of the coiled portion 70a is substantially orthogonal to the axis X1 of the third lens group guide shaft 52 and the rotational axis X2 of the lead screw 36. In the state where the biasing spring 70 is supported by the third lens group frame 51 thereon in this manner, the biasing spring 70 is resiliently deformable in a manner such that the first arm portion 70b and the second arm portion 70c swing about the axis of the coiled portion 70a in directions toward and away from each other. A swing plane (resiliently deforming plane) in which the first arm portion 70b and the second arm portion 70c swing is orthogonal to the plane P2. Namely, the first arm portion 70b and the second arm portion 70c of the biasing spring 70 are resiliently deformed along a plane (biasing plane) substantially parallel to a plane P3 which includes the rotational axis X2 of the lead screw 36. Note that in FIG. 14 the plane P3 is shown as being orthogonal to (at a right-angle to) the plane P2, however, the angle of the plane P3 is not limited to such an angle, and can be set to any desirable angle.

As shown in FIG. 15, both the first arm portion 70b and the second arm portion 70c of the biasing spring 70 are inserted in the spring insertion hole 51p of the third lens group frame 51, and the first arm portion 70b is engaged with the engaging wall portion 51q that is adjacent to the spring insertion hole 51p. On the other hand, the second arm portion 70c is engaged with one of the pair of anti-rotation legs 37d (the right anti-rotation leg 37d with respect to FIG. 15) of the AF nut 37. The second arm portion 70c has a V-bend which is in contact with this one anti-rotation leg 37d. This anti-rotation leg 37d of the AF nut 37 is provided, on a portion thereon with which the second arm portion 70c of the biasing spring 70 is in contact, with an engaging recess 37e. In a state where the first arm portion 70b and the second arm portion 70c are engaged with the engaging wall portion 51q and the engaging recess 37e of the one anti-rotation leg 37d, respectively, the biasing spring 70 is resiliently deformed in directions to make the first arm portion 70b and the second arm portion 70c approach each other. Due to the resilient force of the biasing spring 70 thus deformed, the biasing spring 70 exerts a biasing force on the AF nut 37 so as to bring the aforementioned one anti-rotation leg 37d, with which the second arm portion 70c is in contact, into pressing contact with the adjacent rotation prevention surface 51g1 (the right rotation prevention surface 51g1 with respect to FIG. 15). This biasing force of the biasing spring 70 suppresses vibrations of the AF nut 37 which would be otherwise transmitted to the third lens group frame 51, thus making it possible to prevent noise from occurring even in the case where, e.g., the lead screw 36 is driven intermittently at a high speed.

Figure 16:
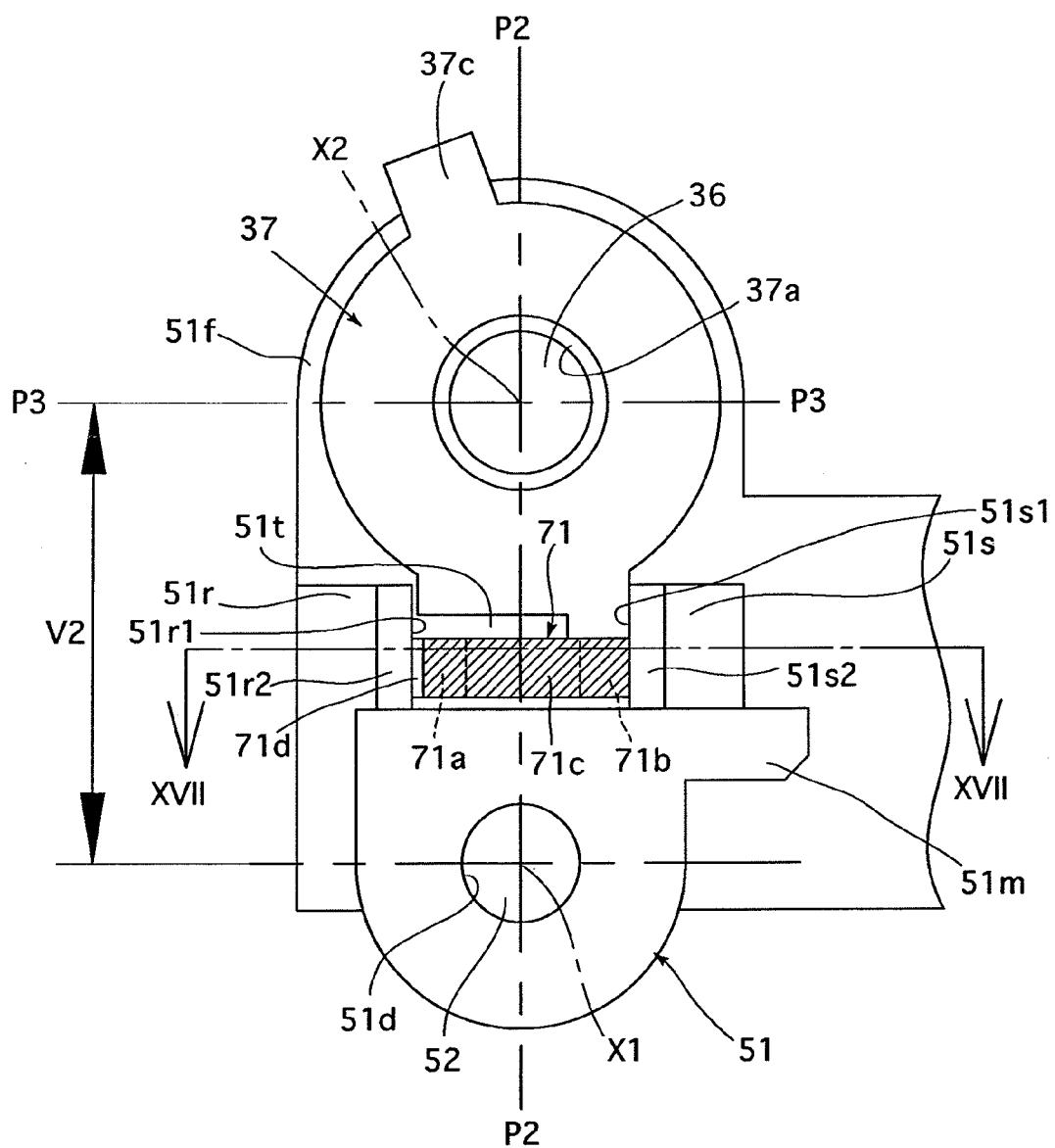
FIG. 16 is an enlarged front elevational view of a portion of another embodiment (second embodiment) of the optical element position control mechanism for the third lens group frame in the vicinity of an AF nut serving as an element of the optical element position control mechanism.
Figure 17:
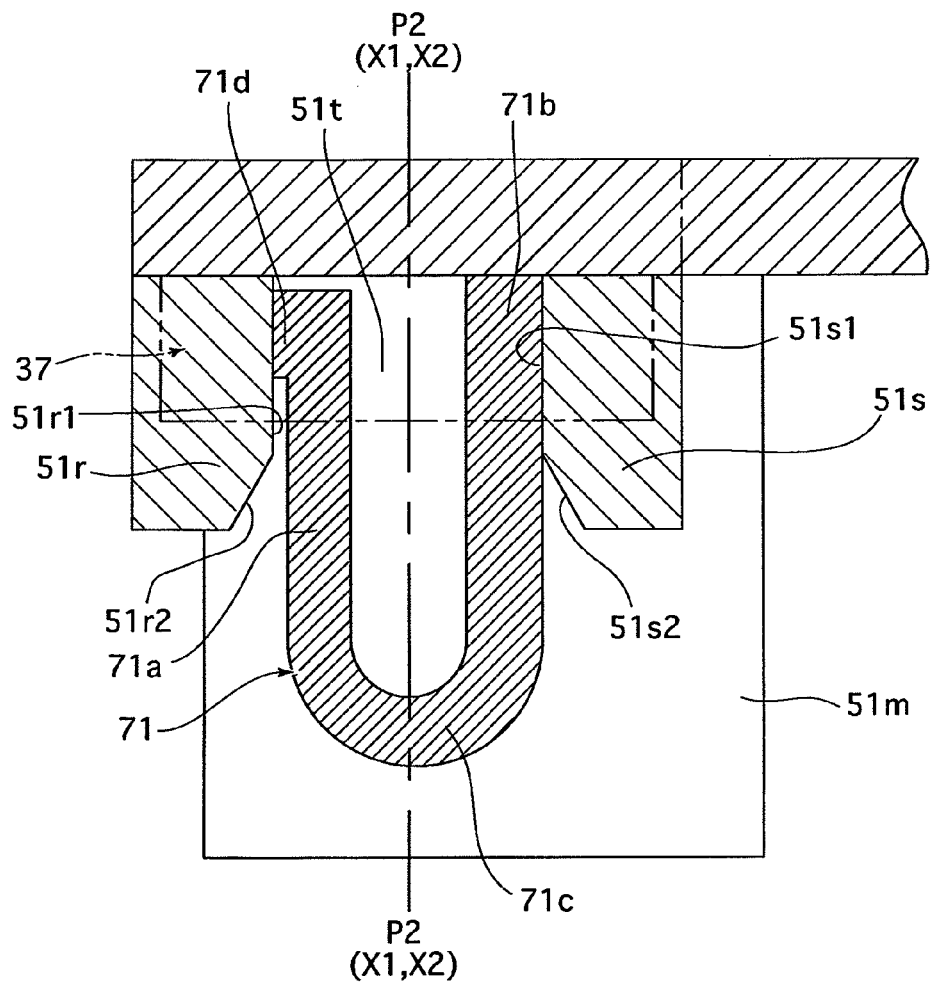
FIG. 17 is a cross sectional view of a portion of the optical element position control mechanism in the vicinity of an anti-rotation portion thereof for the AF nut, taken along the line XVII-XVII shown in FIG. 16.
Figure 18:
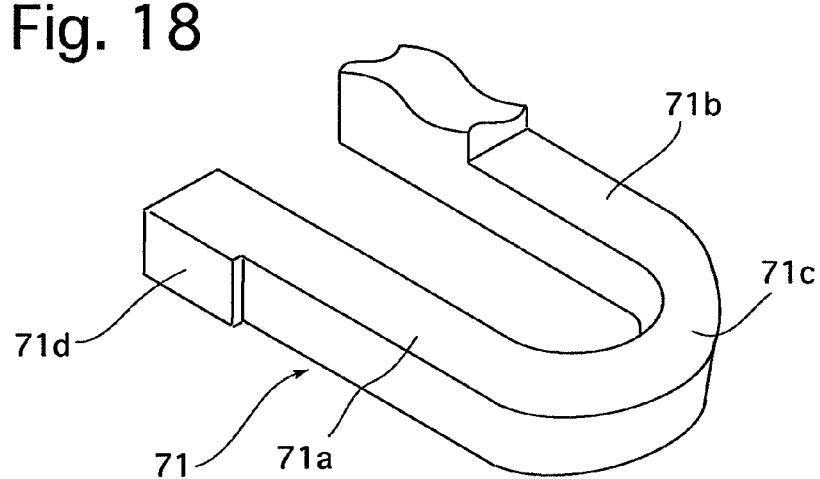
FIG. 18 is a perspective view of a resilient leg portion formed integral with the AF nut shown in FIGS. 16 and 17.

FIGS. 16 through 18 show another embodiment (second embodiment) of the optical element position control mechanism which has a different biasing device provided between the AF nut 37 and the third lens group frame 51. Elements and portions of the embodiment shown in FIGS. 16 through 18 which are similar to those of the previous embodiment are designated by the same reference numerals. In this embodiment, the third lens group frame 51 is provided in the vicinity of the boundary between the nut abutting portion 51f and the top surface portion 51m with a pair of rotation prevention wall portions (rotation prevention device) 51r and 51s, and an insertion space 51t is formed between the pair of rotation prevention wall portions 51r and 51s. The pair of rotation prevention wall portions 51r and 51s are provided with a pair of rotation prevention surfaces (rotation prevention device/ opposed surfaces) 51r1 and 51s1, respectively, which are laterally adjacent to each other in the insertion space 51t. The pair of rotation prevention surfaces 51r1 and 51s1 are parallel to each other and parallel to the axis X1 of the third lens group guide shaft 52 and the rotational axis X2 of the lead screw 36. The pair of rotation prevention surfaces 51r1 and 51s1 are separate from each other in the rotating direction (direction orthogonal to the plane P2) about the rotational axis X2 to face each other. The third lens group frame 51 is provided immediately in front of the pair of rotation prevention surfaces 51r1 and 51s1 with two beveled surfaces 51r2 and 51s2, respectively, which are formed so that the distance between the two beveled surfaces 51r2 and 51s2 gradually increases in the forward direction (downward direction with respect to FIG. 17), away from the pair of rotation prevention surfaces 51r1 and 51s1, respectively.

The AF nut 37 is provided at the bottom thereof with an integrally-molded resilient leg portion (rotation prevention device/biasing device/resiliently contacting portion) 71 which is engaged in the insertion space 51t. In FIG. 16, the resilient leg portion 71 is crosshatched for the sake of clarity. As shown in FIGS. 17 and 18, the resilient leg portion 71 is formed in a U-shape, consisting of a first rotation prevention arm portion 71a, a second rotation prevention arm portion 71b and a curved connecting portion 71c via which the first rotation prevention arm portion 71a and the second rotation prevention arm portion 71b are connected. The second rotation prevention arm portion 71b is connected to a main body of the AF nut 37. The resilient leg portion 71 is provided in the vicinity of the free end of the first rotation prevention arm portion 71a with a contacting portion 71d which projects slightly in a direction away from the second rotation prevention arm portion 71b (leftward as viewed in FIG. 17). The AF nut 37 that includes the resilient leg portion 71 is totally made of synthetic resin, and the resilient leg portion 71 can be resiliently deformable in directions to move the first rotation prevention arm portion 71a and the second rotation prevention arm portion 71b toward and away from each other so as to hinge about the curved connecting portion 71c. This deformation direction of the resilient leg portion 71 is substantially orthogonal to the plane P2, which includes the axis X1 of the third lens group guide shaft 52 and the rotational axis X2 of the lead screw 36. Namely, the first rotation prevention arm portion 71a and the second rotation prevention arm portion 71b of the resilient leg portion 71 are resiliently deformed along a plane (biasing plane) substantially parallel to a plane P3 which includes the rotational axis X2 of the lead screw 36.

The resilient leg portion 71 is inserted into the insertion space 51t with the curved connecting portion 71c being directed forward, with the contacting portion 71d of the first rotation prevention arm portion 71a being made in contact with the rotation prevention surface 51r1 of the rotation prevention wall portion 51r, and with a side surface (right side surface with respect to FIG. 17) of the second rotation prevention arm portion 71b being made in contact with the rotation prevention surface 51s1 (see FIG. 17). The beveled surfaces 51r2 and 51s2 make it possible for the resilient leg portion 71 to be smoothly inserted into the insertion space 51t. As described above, in a state where the resilient leg portion 71 is supported by the third lens group frame 51 in this manner, the resilient leg portion 71 is resiliently deformable along the plane (biasing plane) substantially parallel to the plane P3 which includes the rotational axis X2 of the lead screw 36 in a manner such that the first rotation prevention arm portion 71a and the second rotation prevention arm portion 71b move toward and away from each other. In addition, the resilient leg portion 71 in a state of being inserted into the insertion space 51t is prevented from rotating about the rotational axis X2 of the lead screw 36 by the engagement of the contacting portion 71d of the first rotation prevention arm portion 71a with the rotation prevention wall portion 51r and the engagement of the aforementioned side surface (right side surface with respect to FIG. 17) of the second rotation prevention arm portion 71b with the rotation prevention wall portion 51s. Additionally, in this engaged state, in which the resilient leg portion 71 is engaged with the rotation prevention wall portions 51r and 51s, the resilient leg portion 71 is resiliently deformed in directions to make the first rotation prevention arm portion 71a and the second rotation prevention arm portion 71b approach each other. Due to the resilient force of the resilient leg portion 71 thus deformed, the first rotation prevention arm portion 71a and the second rotation prevention arm portion 71b are pressed against the pair of rotation prevention surfaces 51r1 and 51s1 that face the first rotation prevention arm portion 71a and the second rotation prevention arm portion 71b, respectively. This pressing force of the resilient leg portion 71 suppresses vibrations of each of the first rotation prevention arm portion 71a and the second rotation prevention arm portion 71b which are transmitted to the pair of rotation prevention wall portions 51r and 51s.

Namely, the resilient leg portion 71 serves not only as a rotation prevention device which prevents the AF nut 37 from rotating relative to the third lens group frame 51 but also as a biasing device which exerts a biasing force in this rotation preventing direction on the AF nut 37 to suppress vibrations of the AF nut 37. According to this structure, a biasing device (the resilient leg portion 71) is formed integral with the AF nut 37, which makes it possible to reduce the number of elements of the optical element position control mechanism to thereby simplify the structure thereof. On the first rotation prevention arm portion 71a side, the contacting portion 71d of the first rotation prevention arm portion 71a, not another part (main body part) of the first rotation prevention arm portion 71a, comes into contact with the rotation prevention surface 51r1 upon the resilient leg portion 71 being inserted into the insertion space 51t. Since the contacting portion 71d that positively comes in pressing contact with the rotation prevention surface 51r1 is formed on the resilient leg portion 71, the contacting position of the resilient leg portion 71 relative to the rotation prevention surface 51r1 is controlled so as to be consistent, which consequently makes it possible to stabilize the load on the AF nut 37.

In each of the above described embodiments, a biasing force in a direction to prevent the AF nut 37 from rotating is exerted on the AF nut 37 by the biasing spring 70 or the resilient leg portion 71, and accordingly, the AF nut 37 and the optical element position control mechanism, which includes the AF nut 37, for controlling the position of the third lens group frame 51 can be miniaturized.

Figure 19:
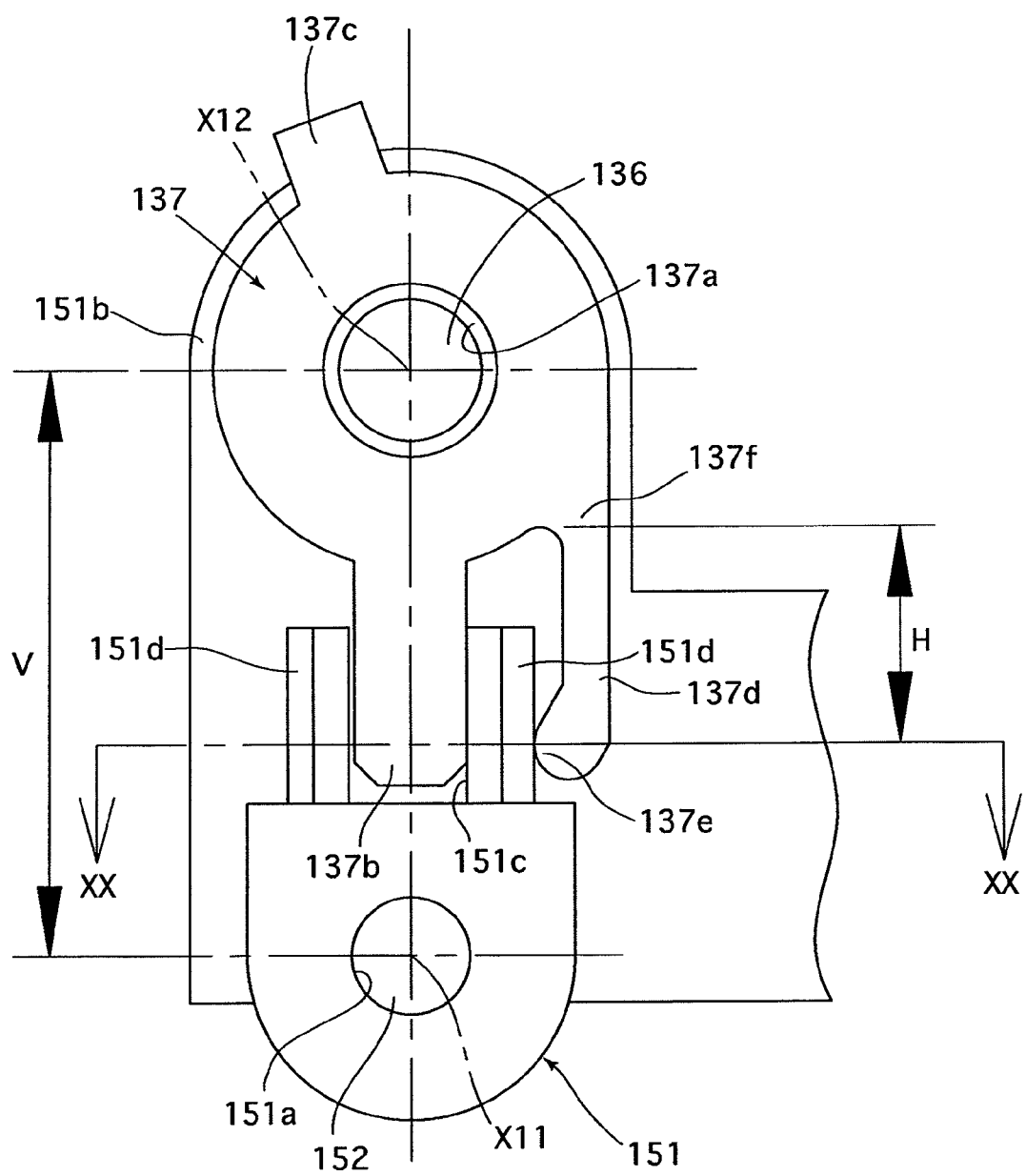
FIG. 19 is an enlarged front elevational view of a portion of a comparative example of an optical element position control mechanism, which is to be compared with the first and second embodiments of the optical element position control mechanisms according to the present invention, in the vicinity of an AF nut serving as an element of the optical element position control mechanism for controlling the position of a lens group frame (lens frame for the third lens group)
Figure 20:
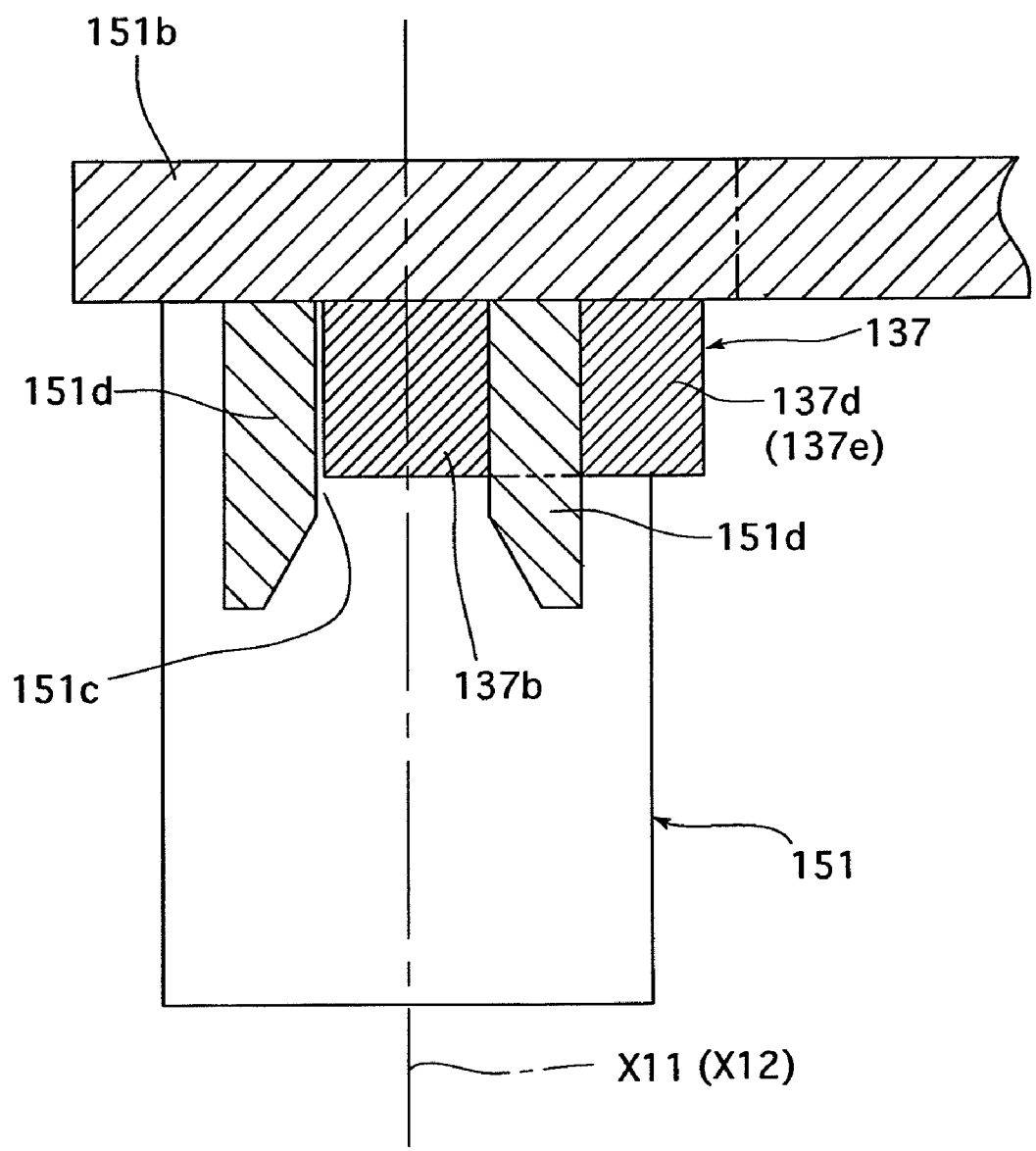
FIG. 20 is a cross sectional view of a portion of the comparative example of the optical element position control mechanism shown in FIG. 19 in the vicinity of an anti-rotation portion thereof for the AF nut, taken along the line XX-XX shown in FIG. 19.

FIGS. 19 and 20 show a comparative example of an optical element position control mechanism, which is to be compared with the above described embodiments according to the present invention. In this comparative example, similar to the above described embodiments, a third lens group frame 151 is guided linearly in the optical axis direction via the slidable engagement of a guide hole 151a with a guide shaft 152, and a lead screw 136 is screw-engaged with a screw hole 137a formed through an AF nut 137. The third lens group frame 151 is biased in a direction to make a nut contacting portion 151b thereof pressed against the AF nut 137 by a spring (not shown). Two anti-rotation projections 137b and 137c which serve as a rotation prevention device project radially outwards from the AF nut 137 in different radial directions. The anti-rotation projection 137c is engaged in an anti-rotation recess formed on a stationary barrel (not shown). In addition, the anti-rotation projection 137b projects in a direction to connect an axis X11 of the guide shaft 152 and a rotational axis X12 of the lead screw 136 to each other, and an anti-rotation groove 151c in which the anti-rotation projection 137b is engaged is formed on the third lens group frame 151. A pair of rotation prevention walls 151d which project from an upper surface of the third lens group frame 151, and the anti-rotation groove 151c is formed between the opposed surfaces of the pair of rotation prevention walls 151d. The AF nut 137 is prevented from rotating about the rotational axis X12 of the lead screw 136 by the engagement of the anti-rotation projection 137b with the anti-rotation groove 151c.

The AF nut 137 further includes a resilient projection 137d which projects in a direction substantially parallel to the anti-rotation projection 137b. The resilient projection 137d is provided in the vicinity of the free end thereof with a contacting point 137e which comes in contact with a side of one of the pair of rotation prevention walls 151d (the right rotation prevention wall 151d with respect to FIG. 19). The resilient projection 137d is resiliently deformable about a fixed end 137f, which is positioned on the opposite side of the free end (the contacting point 137e), in a plane orthogonal (normal) to the rotational axis X12 of the lead screw 136. By this resilient deformation of the resilient projection 137d, the resilient projection 137d suppresses vibrations and rattles of the AF nut 137 which are transmitted to the third lens group frame 151; however, the resilient projection 137d is resiliently deformed in a different direction (orientation) from that of each of the biasing 70 and the resilient leg portion 71 in the above described embodiments. Namely, the resilient projection 137*d* is resiliently deformed in a plane orthogonal to the rotational axis X12 of the lead screw 136 as described above, and a predetermined span H (see FIG. 19) from the fixed end 137*f* to the contacting point 137*e* of the resilient projection 137*d* in this plane that is orthogonal to the rotational axis X12 is required so that the resilient projection 137*d* can be resiliently deformed by an amount of bending required for vibration control. Accordingly, the AF nut 137 increases in size (size as viewed from front) in a direction orthogonal to the rotational axis X12 of the lead screw 136 by an amount corresponding to the span H for securing the required amount of bending. In addition, a distance V (see FIG. 19) between the rotational axis X12 of the lead screw 136 and the axis X1 of the guide shaft 152 increases by an amount corresponding to the span H, which consequently increases the size of the entire drive mechanism for the third lens group frame 151.

In contrast, neither the biasing spring 70 nor the resilient leg portion 71 in each of the above described first and second embodiments requires a long span for resilient deformation of the biasing device in a plane orthogonal to the rotational axis X2 of the lead screw 36 since each of the biasing spring 70 and the resilient leg portion 71 is resiliently deformed in a plane (biasing plane) substantially parallel to the plane P3 which includes the rotational axis X2 of the lead screw 36. Accordingly, the size of the AF nut 37 as viewed from the front can be reduced. In addition, the drive mechanism for the third lens group frame 51 can be miniaturized by reducing a distance V1 (see FIG. 14) or V2 (see FIG. 16) between the rotational axis X2 of the lead screw 36 and the axis X1 of the guide shaft 52. The embodiments shown in FIGS. 14 and 16 and the comparative example shown in FIG. 19 are identical in scale to each other so that the diameters of the guide shaft 52 and the lead screw 36 become equal to the diameters of the guide shaft 152 and the lead screw 136, so that common portions between the AF nuts 37 and 137, which do not contribute to the prevention of rotation of the AF nut, become mutually identical in apparent size in the drawings, and so that common portions between the third lens group frames 51 and 151 which do not contribute to the prevention of rotation of the AF nut become mutually identical in apparent size in the drawings. As can be seen from a comparison between these drawings, each of the above described embodiments shown in FIGS. 14 and 16 according to the present invention has a more compact structure than the comparative example shown in FIG. 19, and accordingly, miniaturization of the optical element position control mechanism has been achieved.

As described above, in the optical element position control mechanism according to the present invention, vibrations between the AF nut 37 and the third lens group frame 51 can be suppressed; moreover, the drive mechanism for the third lens group frame 51, which includes the AF nut 37, can be designed compact.

Although the above described embodiments according to the present invention have been discussed with reference to the accompanied drawings, the present invention is not limited solely to these particular embodiments. For instance, although each of the above described embodiments is an example of an optical element position control mechanism for controlling the position of a lens group for focusing to which the present invention is applied, the present invention is also applicable to a position control mechanism for controlling the position of an optical element other than a focusing lens group or an optical element other than a lens group.

In addition, although each of the above described embodiments of the optical element position control mechanisms moves an optical element in a direction along an optical axis of an optical system, the present invention can also be applied to an optical element position control mechanism which moves an optical element in any other direction, e.g., in a direction orthogonal to an optical axis of an optical system. In recent years the demand for this type of optical element position control mechanism as a camera shake reduction system that moves an optical element in a direction orthogonal to an optical axis of an optical system has been increasing. In addition, camera shake reduction systems typically have to operate under conditions in which a linearly moving nut undesirably vibrates when the associated motor(s) for shake reduction are driven finely at a high speed, and the demand for weight reduction and miniaturization of the camera shake reduction system has been great. The application of the present invention to a camera shake reduction system is especially effective.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical element position control mechanism comprising:

an optical element holding member which holds an optical element and is linearly movable;

a lead screw rotatable on a rotational axis extending parallel to a direction of movement of said optical element holding member;

a linearly moving nut which is screw-engaged with said lead screw; and a rotation prevention device which prevents said linearly moving nut from rotating about said rotational axis of said lead screw, wherein forward and reverse rotations of said lead screw cause said linearly moving nut to move forward and rearward along said rotational axis of said lead screw, respectively, a position of said optical element holding member being determined by said forward and rearward movements of said linearly moving nut, and wherein said optical element position control mechanism includes a biasing device, wherein said biasing device is resiliently deformable in a biasing plane substantially parallel to a plane which includes said rotational axis of said lead screw, and applies a biasing force against said linearly moving nut in a rotation-preventing direction in which said linearly moving nut is prevented from rotating by said rotation prevention device.

2. The optical element position control mechanism according to claim 1, wherein said biasing device comprises a torsion spring comprising:

a first arm portion, the resilient deformation thereof in said biasing plane being restricted; and a second arm portion engaged with said linearly moving nut, wherein said torsion spring can be resiliently deformed so as to rotate said first arm portion and said second arm portion toward and away from each other about an axis substantially orthogonal to said rotational axis of said lead screw.

3. The optical element position control mechanism according to claim 2, wherein said rotation prevention device prevents said linearly moving nut from rotating relative to said optical element holding member, and wherein said first arm portion of said torsion spring engages with said optical element holding member.

4. The optical element position control mechanism according to claim 3, wherein said rotation prevention device comprises:
  an anti-rotation projection which projects from said optical element holding member; and
  a pair of anti-rotation legs which is formed on said linearly moving nut and holds said anti-rotation projection between said pair of anti-rotation legs,
  wherein said second arm portion of said torsion spring is in contact with one of said pair of anti-rotation legs and presses said one anti-rotation leg against said anti-rotation projection of said optical element holding member.

5. The optical element position control mechanism according to claim 1, wherein said rotation prevention device comprises:
  a pair of opposed surfaces formed on said optical element holding member, said pair of opposed surfaces being spaced apart from each other in a rotation direction about said rotational axis of said lead screw so as to be opposed to each other, and
  a resiliently contacting portion provided on said linearly moving nut, said resiliently contacting portion being inserted in between said pair of opposed surfaces to be resiliently pressed against said pair of opposed surfaces, said resiliently contacting portion also serving as said biasing device.

6. The optical element position control mechanism according to claim 5, wherein said pair of opposed surfaces extend in directions substantially parallel to said rotational axis of said lead screw and lie substantially orthogonal to said biasing plane in which said resiliently contacting portion is resiliently deformable.

7. The optical element position control mechanism according to claim 5, wherein said resiliently contacting portion of said linearly moving nut is formed into a U-shape and comprises:
  a pair of rotation prevention arm portions which extend substantially parallel to each other and are in contact with said pair of opposed surfaces, respectively; and
  a curved connecting portion which connects said pair of rotation prevention arm portions to each other to allow said pair of rotation prevention arm portions to be resiliently deformed.

8. The optical element position control mechanism according to claim 1, wherein said optical element comprises a lens group, and
  wherein said optical element holding member is guided linearly in a direction parallel to an optical axis of said lens group.

9. The optical element position control mechanism according to claim 8, wherein said lens group serves as a focusing lens group.

10. The optical element position control mechanism according to claim 1, wherein said biasing device comprises a metal spring.

11. The optical element position control mechanism according to claim 1, wherein said biasing device is molded as part of said linearly moving nut.

12. A mechanism for controlling the position of a focusing lens group, comprising:
  a lens holder which holds said focusing lens group and is guided linearly in a direction of an optical axis of said focusing lens group;
  a lead screw extending in said optical axis direction;
  a linearly moving nut engaged with said lens holder, having a screw hole in which said lead screw is screw-engaged and being prevented from rotating relative to said lead screw; and
  a biasing device positioned between said linearly moving nut and said lens holder for biasing said linearly moving nut in a direction to prevent said linearly moving nut from rotating relative to said lead screw, wherein said biasing device is resiliently deformed in a plane substantially parallel to a plane including said rotational axis of said lead screw,
  wherein forward and reverse rotations of said lead screw cause said linearly moving nut to move forward and rearward along said rotational axis of said lead screw to thereby move said lens holder forward and rearward in said optical axis direction, respectively.

* * * * *